(12) United States Patent
Oumi et al.

(10) Patent No.: US 6,856,473 B2
(45) Date of Patent: Feb. 15, 2005

(54) METHOD OF FABRICATING OPTICAL APERTURE AND METHOD OF FABRICATING PROBE FOR NEAR FIELD LIGHT DEVICE

(75) Inventors: Manabu Oumi, Chiba (JP); Susumu Ichihara, Chiba (JP); Kenji Kato, Chiba (JP); Yasuyuki Mitsuoka, Chiba (JP); Takashi Niwa, Chiba (JP); Nobuyuki Kasama, Chiba (JP); Hidetaka Maeda, Chiba (JP); Yoko Shinohara, Chiba (JP)

(73) Assignee: Seiko Instruments Inc., Chiba (JP)

( * ) Notice: Subject to any disclaimer, the term of this patent is extended or adjusted under 35 U.S.C. 154(b) by 301 days.

(21) Appl. No.: 09/997,484

(22) Filed: Nov. 21, 2001

(65) Prior Publication Data

US 2002/0075569 A1 Jun. 20, 2002

(30) Foreign Application Priority Data

| Nov. 22, 2000 | (JP) | ......................................... 2000-355972 |
| Dec. 1, 2000 | (JP) | ......................................... 2000-367560 |
| Dec. 7, 2000 | (JP) | ......................................... 2000-373307 |
| Dec. 12, 2000 | (JP) | ......................................... 2000-377253 |
| Dec. 12, 2000 | (JP) | ......................................... 2000-377254 |

(51) Int. Cl.$^7$ .............................. G02B 9/08; H01J 1/56
(52) U.S. Cl. ......................... 359/739; 359/738; 250/229
(58) Field of Search ........................... 73/105; 250/229, 250/306; 359/738, 739

(56) References Cited

U.S. PATENT DOCUMENTS

| 4,684,206 A | 8/1987 | Bednorz et al. ............ 385/129 |
| 5,333,495 A | 8/1994 | Yamaguchi et al. .......... 73/105 |

Primary Examiner—David N. Spector
(74) Attorney, Agent, or Firm—Adams & Wilks

(57) ABSTRACT

An optical aperture is fabricated by providing a pressing body and object having a substrate, at least one conical- or pyramidal-shaped tip disposed on the substrate, at least one stopper disposed on the substrate at a vicinity of the tip, and an optical shielding film disposed on at least a portion of each of the stopper and the tip. A surface of the pressing body is then disposed in confronting relation to the object. The pressing body is then displaced to bring the surface of the pressing body in contact with the object so that a force component is directed to a front end of the tip to form an optical aperture at the front end of the tip.

24 Claims, 32 Drawing Sheets

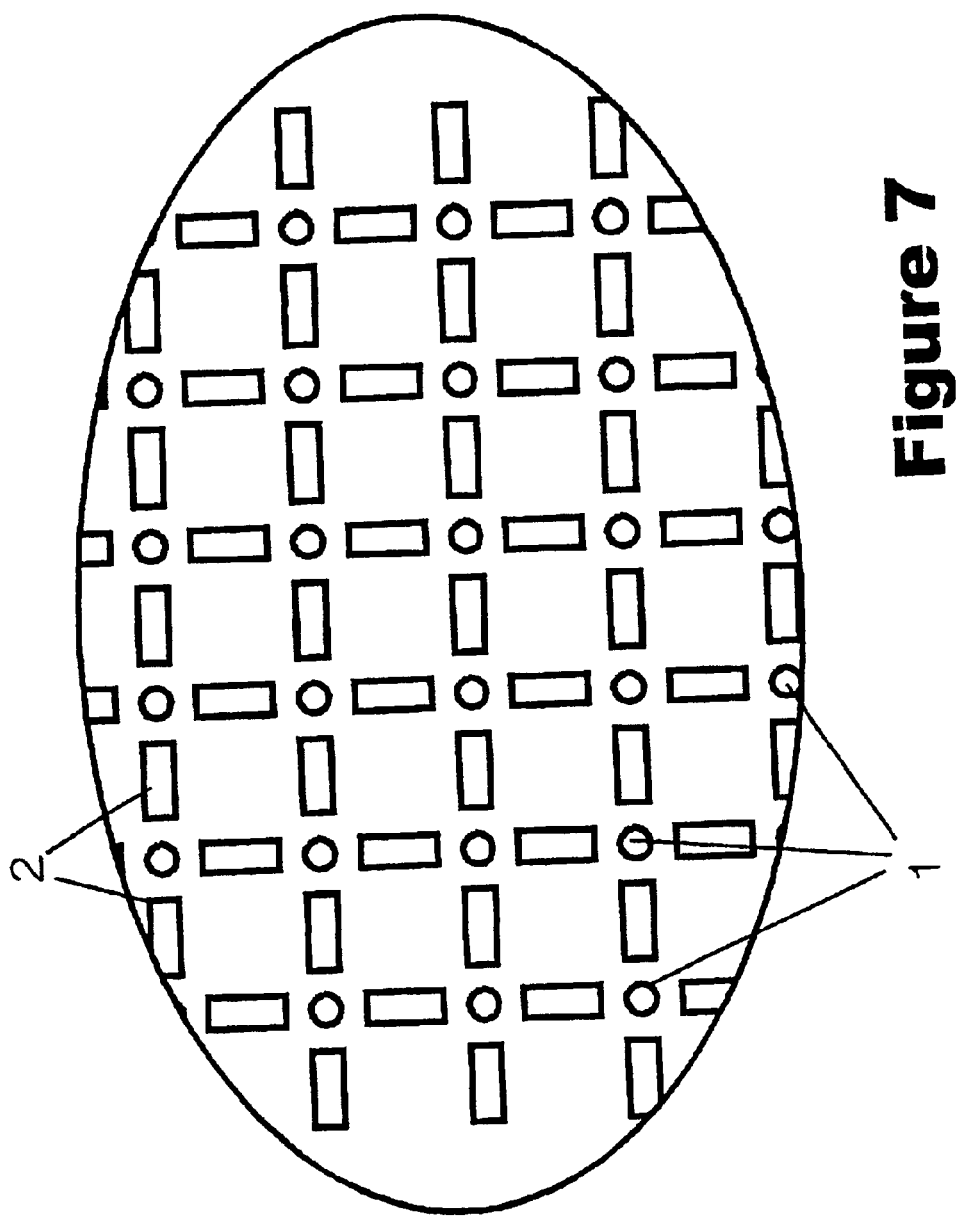

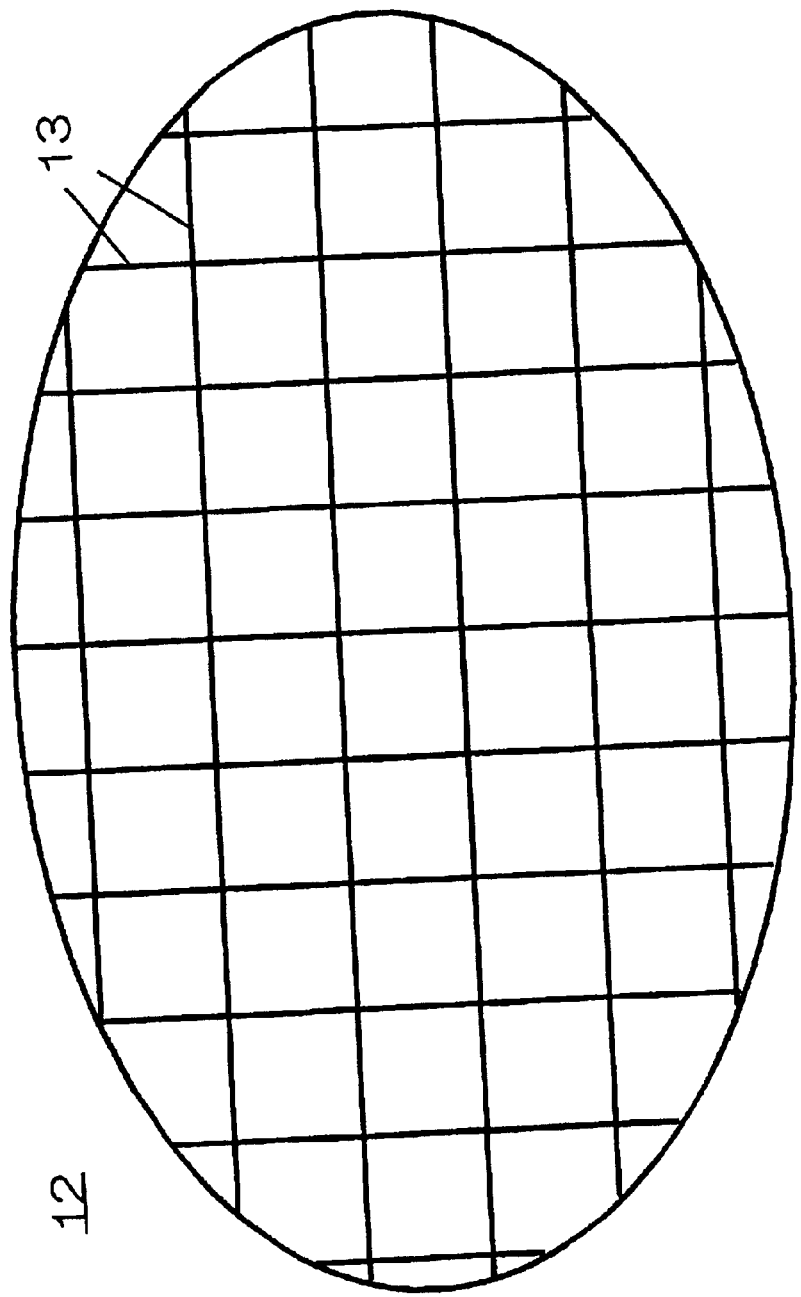

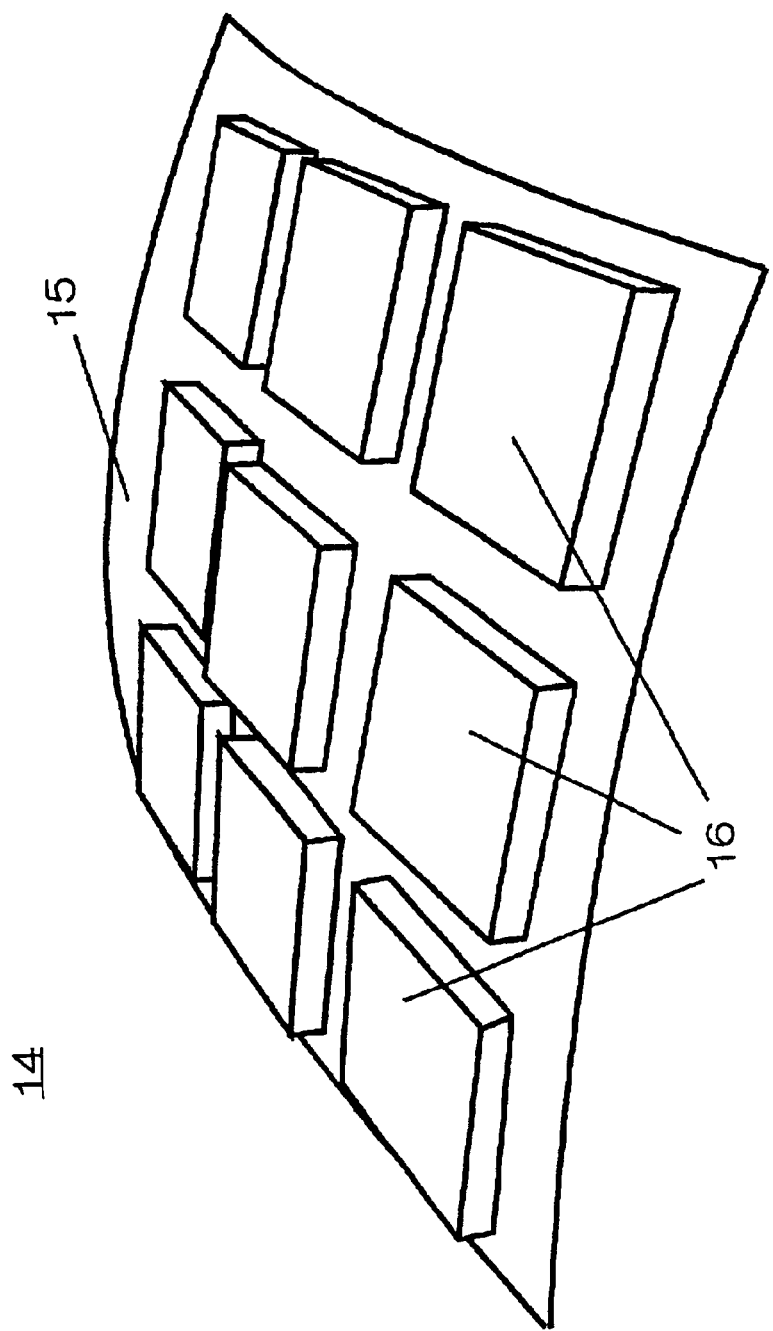

METHOD OF FABRICATING OPTICAL APERTURE AND METHOD OF FABRICATING PROBE FOR NEAR FIELD LIGHT DEVICE

BACKGROUND OF THE INVENTION

1. Field of the Invention

The present invention relates to a method of fabricating an optical aperture. Particularly, the invention relates to a method of forming an optical aperture at a probe used in a near field light device for irradiating and detecting near field light.

2. Background Information

There is used a scanning probe microscope (SPM) represented by a scanning tunnel microscope (STM) or an atomic force microscope (AFM) for observing a very small area of a nanometer order at a surface of a sample. Although SPM can acquire an image of a resolution dependent on a shape of a front end of a probe by scanning a probe having a sharpened front end at a surface of a sample via interactive operation produced between the probe and the surface of the sample such as tunnel current or atomic force as an object of observation, a restriction imposed on the sample to be observed is comparatively severe.

Hence, currently, attention is attracted to a near field optical microscope (SNOM) capable of observing a very small area of a surface of a sample by constituting an object of observation by interactive operation caused between near field light and a probe produced at the surface of the sample.

According to the near field optical microscope, near field light is irradiated to the surface of the sample from an aperture provided at a sharpened front end of an optical fiber. The aperture is provided with a size equal to or smaller than a diffraction limit of a wavelength of light introduced into the optical fiber, which is, for example, a diameter of about 100 nm. A distance between the aperture formed at the front end of the probe and the sample is controlled by the technology of SPM and its value is equal to or smaller than the size of the aperture. In this case, a spot diameter of near field light on the sample is substantially the same as the size of the aperture. Therefore, by scanning near field light irradiated to the surface of the sample, observation of optical properties of the sample at the very small area can be carried out.

In addition to use as a microscope, there is enabled an application as high density optical storage recording in which by introducing light having a comparatively large density toward a sample via an optical fiber probe, near field light having a high energy density is produced at an aperture of the optical fiber probe and a structure or a physical property of the surface of the sample is locally changed by the near field light. There has been carried out a trial of enlarging a front end angle of the front end of the probe to acquire near field light having a large intensity.

According to the devices utilizing near field light, formation of the aperture is most important. As one of methods of fabricating the aperture, there is known a method disclosed in Japanese Patent No. 21201-1993. In this method, an optical shielding film is deposited on a sharpened light waveguide. According to the method of fabricating the aperture, by pressing the sharpened light waveguide having the optical shielding film against a hard flat plate by a very small amount and in a controlled manner using a piezoelectric actuator, the optical shielding film at the front end is subjected to plastic deformation.

Further, as a method of forming an aperture, there is a method disclosed in Japanese Patent Laid-Open No. 265520/1999. According to the method of fabricating the aperture, an object of forming the aperture is a front end of a projection formed on a flat plate by focused ion beam (FIB). The method of forming the aperture is carried out by irradiating FIB from a side face to an optical shielding film at the front end of the projection to thereby remove the optical shielding film at the front end of the projection.

However, according to the method of Japanese Patent No. 21201/1993, the aperture can be formed respectively for only a single piece of light waveguide. Further, according to the method of Japanese Patent No. 21201/1993, the amount of pressing must be controlled by the piezoelectric actuator having several nm of movement resolution and accordingly, the aperture forming apparatus must be placed under an environment having insignificant influence by other apparatus or vibration of air. Further, the procedure for bringing a light carrier rod into orthogonal contact with the flat plate is time consuming. Further, a mechanical translation base having a large moving amount is needed other than the piezoelectric actuator having a small moving amount. Further, a control apparatus is needed to control the pressing amount by the piezoelectric actuator having the small movement resolution, and a time period of several minutes is required to control the amount of pressing to thereby form the aperture. Therefore, there are needed large-scaled apparatus such as a high voltage power source and a feedback circuit for fabricating the aperture. As a result of the foregoing, the cost for forming the aperture is high.

Further, according to the method of the Japanese Patent Laid-Open No. 265520/1999, although the object of fabrication is the projection on the flat plate, since the aperture is formed by using FIB, a time period required for forming a single one of the aperture is as long as about 10 minutes. Further, the sample must be placed in vacuum in order to use FIB. Therefore, there poses a problem that fabrication cost required for forming the aperture is increased.

SUMMARY OF THE INVENTION

Hence, it is a feature of the invention to realize a method of forming an optical aperture at a low cost.

The invention has been carried out in view of the above-described problem and according to a method of fabricating an optical aperture of the invention, a face of a pushing body is made to be opposed to an object for aperture formation having a tip of a conical or a pyramidal shape formed at a substrate, a stopper arranged at a vicinity of the tip and a optical shielding film formed at least above the tip to cover at least a portion of the stopper and the tip and the pushing body is pushed to the object for aperture formation by force having a component directed to the tip to thereby form the optical aperture at a front end of the tip.

Further, a pushing body having a stopper projected in a direction of an object of aperture formation to the object for aperture formation having a tip of a conical or a pyramidal shape and a optical shielding film formed at least above the tip and the pushing body is displaced by exerting force having a component directed to the tip thereto to thereby form an optical aperture at a front end of the tip.

Further, there are formed a plurality of the tips and optical apertures are formed in one operation at front ends of the plurality of tips.

Further, a portion of the pushing body brought into contact with the tip and the stopper is constituted by a substantially flat face. Further, the pushing body is constituted by a plate and a pressing tool.

Further, according to the invention, there is provided a method of fabricating a probe for a near field light device, the method comprising a step of fabricating a tip for transmitting light having a desired wavelength on a substrate, a step of fabricating a stopper arranged at a surrounding of the tip, a step of forming a optical shielding film covering the tip, and a step of forming an optical aperture at a front end of the tip by exerting a force simultaneously to the tip and the stopper by using a pushing body having a substantially flat face.

BRIEF DESCRIPTION OF THE DRAWINGS

FIG. 7 is a view explaining of a method of fabricating an optical aperture according to Embodiment 3 of the invention;

FIG. 8 is a view explaining of the method of fabricating the optical aperture according to Embodiment 3 of the invention;

FIG. 9 is a view showing a sheet 14 having a pushing plate used in a method of fabricating an optical aperture according to Embodiment 4 of the invention;

DETAILED DESCRIPTION OF THE PREFERRED EMBODIMENTS

A detailed explanation will be given of a method of forming an optical aperture of the invention and a near field light device fabricated by the forming method in reference to the drawings as follows.

(Embodiment 1)

An explanation will be given of a method of forming an aperture according to Embodiment 1 of the invention in reference to FIG. 1 through FIG. 3.

Figure 1:
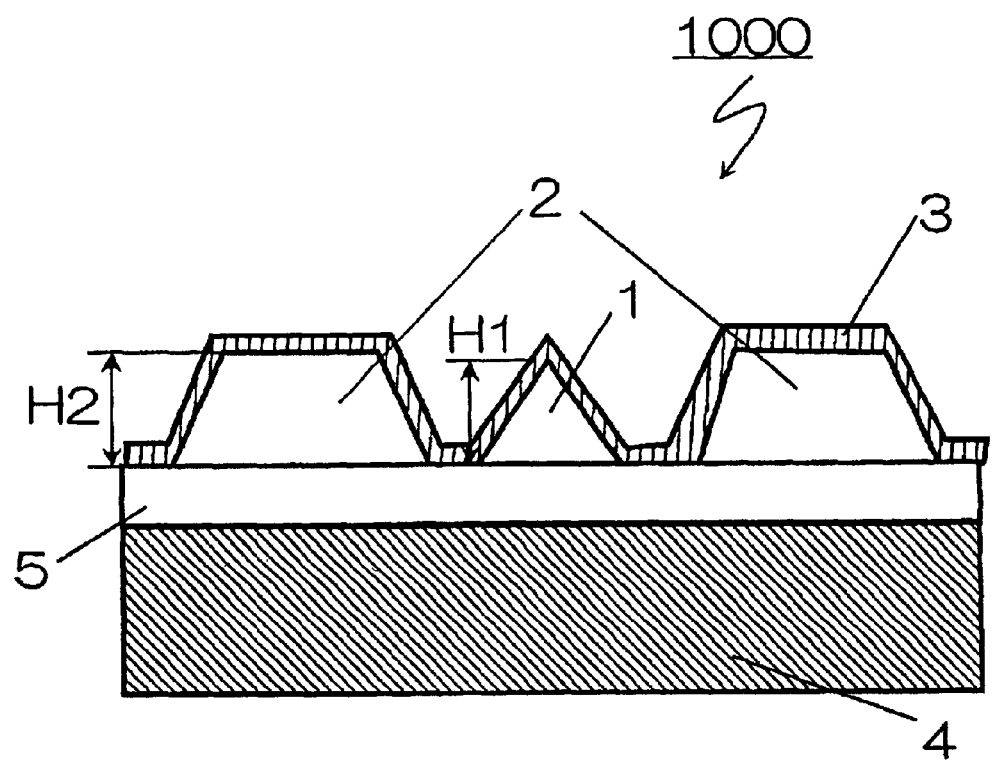
FIG. 1 is a view explaining of a method of forming an aperture according to Embodiment 1 of the invention.

FIG. 1 is a schematic sectional view showing an outline constitution of a workpiece 1000. A transparent layer 5 is formed on a substrate 4, a tip 1 of a conical or pyramidal shape and a stopper 2 in a ridged shape are formed on the transparent layer 5 and an optical shielding film 3 is formed above the tip 1, the stopper 2 and the transparent layer 5. Further, in the workpiece 1000, the transparent layer 5 is not necessarily needed and in that case, the optical shielding film 3 is formed on the tip 1, the stopper 2 and the substrate 4. Further, the optical shielding film 3 may be deposited only on the tip 1.

A height H1 of the tip 1 and a height H2 of the stopper 2 are equal to or smaller than several mm. A difference between the height H1 and the height H2 is equal to or smaller than 1000 nm. An interval between the tip 1 and the stopper 2 is equal to or smaller than several mm. Further, a thickness of the optical shielding film 3 falls in a range of several 10 nm through several 100 nm although the thickness differs by its material.

There are used dielectrics having high transmittivity in a range of visible light such as silicon dioxide, diamond and the like, dielectrics having high transmittivity in a range of infrared light such as SeZn, silicon and the like and materials having high transmittivity in a range of ultraviolet light such as MgF, CaF and the like for the tip 1, the stopper 2 and the transparent layer 5. Further, as a material of the tip 1, a material transmitting light in a wavelength band of light transmitting the aperture even by a small amount can be used. Further, the tip 1, the stopper 2 and the transparent layer 5 may be constituted by the same material or may be constituted by separate materials. For example, there are used metals of aluminum, chromium, gold, platinum, silver, copper, titanium, tungsten, nickel, cobalt and the like and alloys of these.

Figure 2:
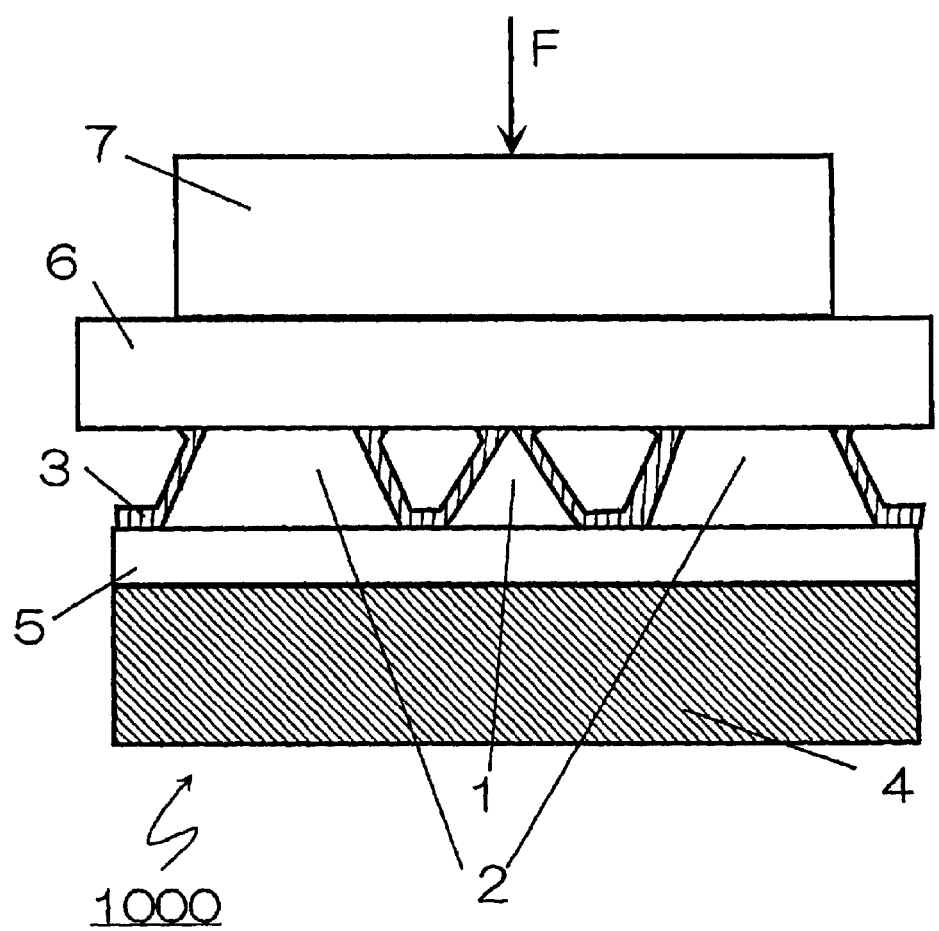
FIG. 2 is a view explaining of the method of forming the aperture according to Embodiment 1 of the invention.

FIG. 2 is a view showing a state of subjecting the optical shielding film 3 to plastic deformation in the method of forming the aperture. A plate 6 covering the tip 1 and at least a portion of the stopper 2 and constituting a flat face on the side of the tip 1 and the stopper 2, is mounted on the workpiece 1000 shown in FIG. 1 and a pressing tool 7 is mounted on the plate 6. By exerting force F to the pressing tool 7 in a direction of a central axis of the tip 1, the plate 6 is moved toward the tip 1. A contact area of the stopper 2 and the plate 6 is several hundreds through several tens of thousands times as large as a contact area of the tip 1 and the plate 6. Therefore, the force F is dispersed by the stopper 2, and as a result, displacement of the plate 6 is reduced. Since the displacement of the plate 6 is small, an amount of plastic deformation provided to the optical shielding film 3 is very small. Further, the tip 1 and the stopper 2 are only subjected to very small elastic deformation. As a method of exerting the force F, there is a method of lifting a weight having a predetermined weight by a predetermined distance and dropping the weight freely, a method of attaching a spring having a predetermined spring constant to the pressing tool 7 and pressing the spring by a predetermined distance or the like. When the plate 6 comprises a material harder than the optical shielding film and softer than the tip 1 and the stopper 2, the force received by the tip 1 and the stopper 2 is absorbed by the plate 6 and therefore, the displacement of the plate 6 is further reduced to thereby facilitate to reduce the amount of plastic deformation of the optical shielding film 3.

Figure 3:
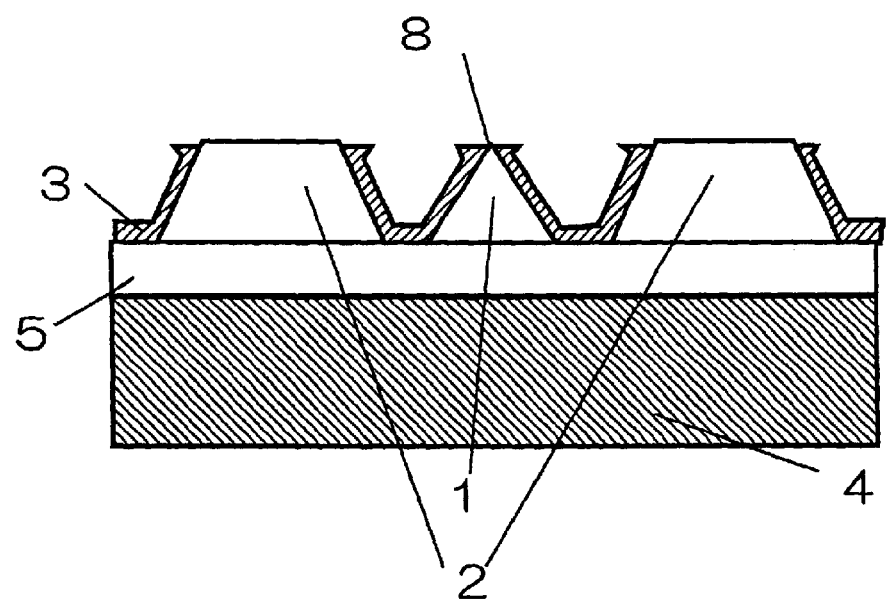
FIG. 3 is a view explaining of the method of forming the aperture according to Embodiment 1 of the invention.

FIG. 3 shows a state in which after exerting the force F in this way, the plate 6 and the pressing tool 7 are removed. As described above, the amount of plastic deformation of the optical shielding film 3 is very small, the tip 1 and the stopper 2 are deformed only in an area of elastic deformation and therefore, an aperture 8 is formed at a front end of the tip 1. A size of the aperture 8 is a size of from several nm to about a wavelength of light passing through the tip 1. Further, although in the above-described, the plate 6 is inserted between the pressing tool 7 and the workpiece 1000, the aperture 8 can naturally be formed similarly also by removing the plate 6 and pressing the workpiece 1000 directly by the pressing tool 7. In order to introduce light to the aperture 8, by exposing at least a portion of the transparent member 5 or the tip 1 by etching the substrate 4 from a side opposed to a face of the substrate 4 for forming the tip 1, an entrance for light to the aperture 8 is formed. Further, by constituting the substrate 4 by a transparent material, a step of forming the entrance for light can naturally be dispensed with.

As has been explained above, according to the method of fabricating the aperture of the invention, the displacement of the plate 6 can excellently be controlled by the stopper 2, further, the displacement of the plate 6 can be made very small and therefore, the aperture 8 having a uniform and small size can easily be fabricated at the front end of the tip 1. Further, near field light can be generated from the aperture 8 by irradiating light from the side of the substrate.

Figure 4A:
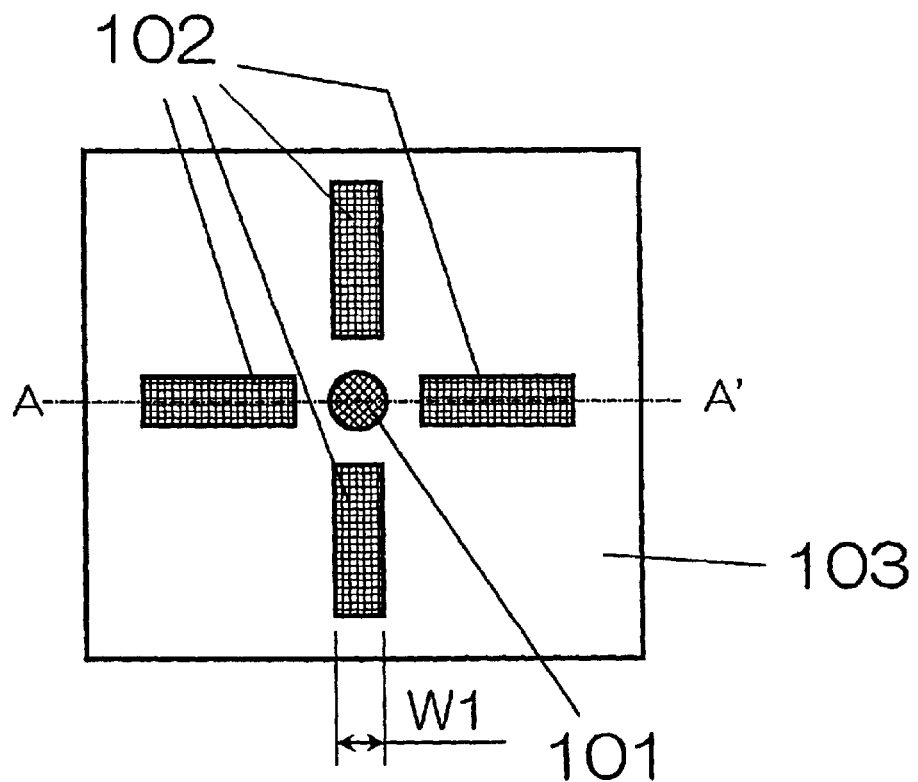
FIGS. 4A and 4B are views explaining a method of fabricating a workpiece 1000.
Figure 4B:
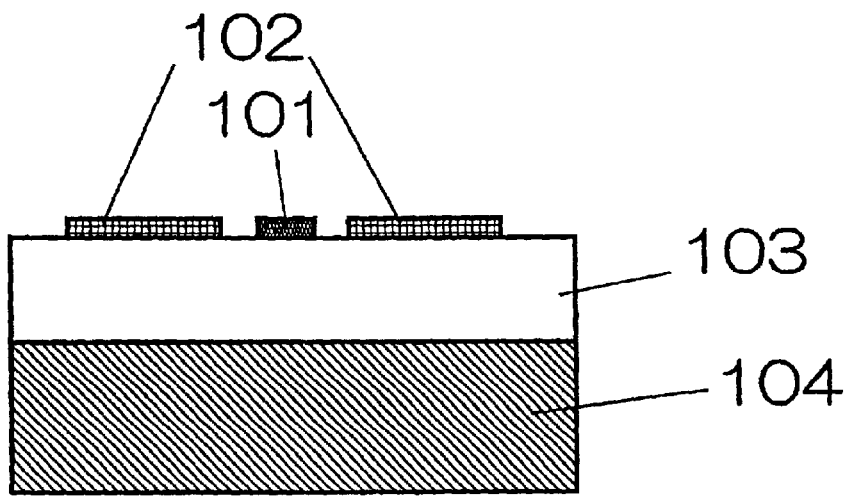

An explanation will be given hereof a method of fabricating the workpiece 1000 in reference to FIGS. 4A and 4B and FIGS. 5A and 5B. FIGS. 4A and 4B show a state in which a mask 101 for tip and a mask 102 for stopper are formed at a transparent material 103 formed on a substrate material 104. FIG. 4A is a top view and FIG. 4B is a sectional view at a position indicated by A–A' of FIG. 4A.

The transparent material 103 is formed on the substrate material 104 by chemical vapor deposition (CVD) or spin coat. Or, the transparent material 103 can also be formed on the substrate material 104 by a method of solid state bonding or glue. The mask 101 for tip and the mask 102 for stopper are formed in desired shapes on the transparent material 103. The mask 101 for tip and the mask 102 for stopper may be formed simultaneously or may be formed separately. These masks can be formed in desired shapes by photolithography steps or the like. Further, as the transparent material 103, there is used a dielectric having high transmittivity in a range of visible light such as silicon dioxide or diamond, a dielectric having high transmittivity in a range of infrared light such as SeZn or silicon or a material having high transmittivity in a range of ultraviolet light such as MgF or Caf. Although a photoresist or a nitride film is normally used for the mask 101 for tip and the mask 102 for stopper, may pertinently be selected in accordance with a material of the transparent material 103 and an etchant used in a successive step.

A diameter of the mask 101 for tip is, for example, equal to or smaller than several mm. A width W1 of the mask 102 for stopper may be equal to the diameter of the mask 101 for tip or the width may be wider or narrower and the width W1 by several 10 nm through several $\mu$m. Further, a length of the mask 102 for stopper is equal to or smaller than several 10 $\mu$m.

Figure 5A:
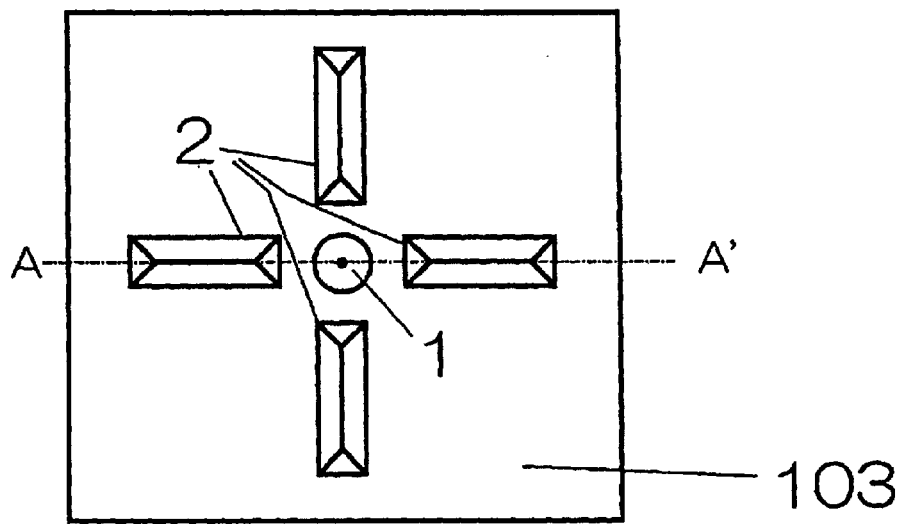
FIGS. 5A and 5B are views explaining the method of fabricating the workpiece 1000.
Figure 5B:
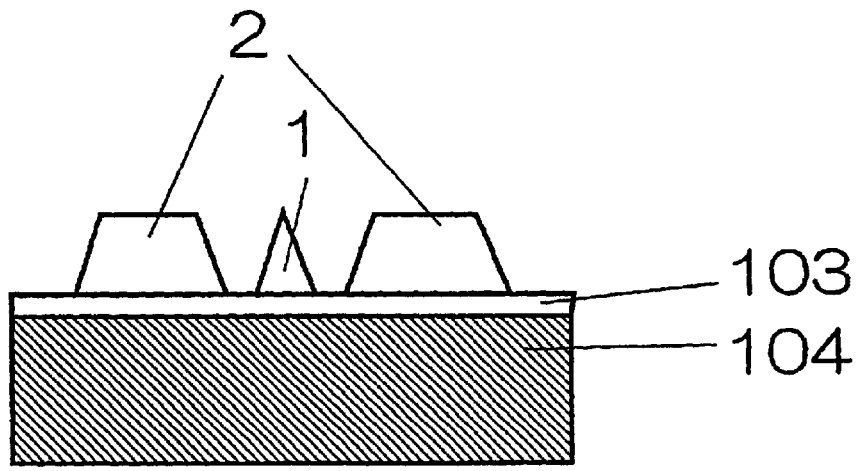

FIGS. 5A and 5B show a state of forming the tip 1 and the stopper 2. FIG. 5A is a top view and FIG. 5B is a sectional view of a position indicated by A–A' of FIG. 5A. After forming the mask 101 for tip and the mask 102 for stopper as shown by FIG. 4A, the transparent material 103 is etched by isotropic etching by wet etching and the tip 1 and the stopper 2 as shown by FIGS. 5A and 5B are formed. In accordance with a relationship among the thickness of the transparent material 103 and the heights of the tip 1 and the stopper 2, the transparent layer 5 of FIG. 1 is formed or is not formed. Here, a radius of the front end of the tip 1 falls in a range of several nm through several 100 nm. Thereafter, by depositing the optical shielding film by a method of sputtering or vacuum evaporation, the workpiece 1000 shown in FIG. 1 can be formed.

Further, when the optical shielding film 3 of FIG. 1 is deposited only on the tip 1, in a step of depositing the optical shielding film 3, a metal mask having a shape of depositing the optical shielding film 3 on the tip 1 is mounted and sputtering or vacuum evaporation is carried out. Further, the optical shielding film 3 can naturally be formed only on the tip 1 also by depositing the optical shielding film 3 on an entire face of a face of the workpiece 1000 formed with the tip and thereafter, using a photolithography step of leaving the optical shielding film 3 only at the tip 1.

As has been explained above, according to Embodiment 1 of the invention, the displacement of the plate 6 can be reduced by providing the stopper 2 and therefore, even when an actuator having high resolution is not used, the aperture 8 having a uniform and very small size can easily be formed at the front end of the tip 1. According to an experiment of the inventors, the aperture 8 having a diameter equal to or smaller than 100 nm can be formed by only knocking at the pressing tool 7 by a hand-held hammer. Further, control of the heights of the tip 1 and the stopper 2 is facilitated and therefore, the yield of fabricating the aperture 8 is promoted. Further, the workpiece 1000 explained in Embodiment 1 of the invention can be fabricated by the photolithography step and therefore, a plurality of pieces thereof can be fabricated at a sample having a large area such as a wafer and by making the force F constant, the aperture 8 having a uniform aperture diameter can be formed at each of the workpices 1000 fabricated by a plurality of pieces thereof. Further, it is very simple to change the magnitude of the force F and therefore, the apertures 8 having individually different aperture diameters can be formed at the workpieces 1000 fabricated by a plurality of pieces thereof. Further, the aperture 8 is formed by simply exerting the force F and therefore, a time period taken for fabricating the aperture is as very short as several seconds through several tens seconds. Further, according to Embodiment 1 of the invention, any fabrication environment can be used. Therefore, the workpiece 1000 can be fabricated in the atmosphere and a fabricated state thereof can be observed immediately by an optical microscope or the like. Further, by fabricating the workpiece 1000 in a scanning electron microscope, the fabricated state can also be observed by resolution higher than that of an optical microscope. Further, by fabricating the workpiece 1000 in a liquid, the liquid serves as a damper and therefore, a fabricating condition having improved controllability can be achieved. Further, positioning of the pressing tool 7 and the tip 1 can easily be carried out by using the stopper 2 as a mark.

Further, by exerting the force F to a sample fabricated with a plurality of pieces of the workpieces 1000, a plurality of pieces of the aperture 8 having a uniform aperture diameter can also be fabricated in one operation. When the apertures 8 are fabricated in this manner, a time period of fabricating a single piece of the aperture becomes as very short as several hundreds milliseconds or shorter although depending on a number of the workpieces 1000 per sheet of wafer.

(Embodiment 2)

Figure 6A:
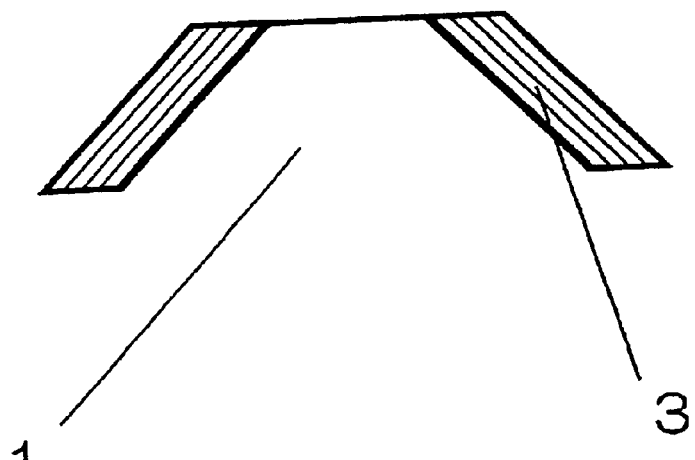
FIGS. 6A and 6B are views showing a shape of a front end of a tip fabricated by a method according to Embodiment 2 of the invention.
Figure 6B:
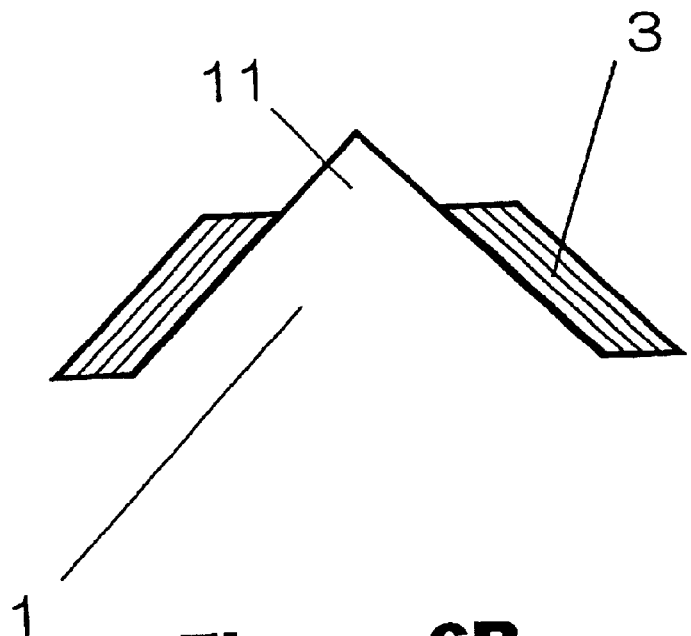

FIGS. 6A and 6B show tips of front ends of tips fabricated by a method according to Embodiment 2 of the invention. A difference thereof from Embodiment 1 resides in carrying out a case in which the material of the plate 6 is harder than the material of the tip 1 and a case in which the material of the plate 6 is softer than the material of the tip 1 and other steps are the same as those of Embodiment 1 and therefore, an explanation thereof will be omitted. FIG. 6A shows a shape of a front end of a tip fabricated when the material of the plate 6 is harder than the material of the tip 1 and FIG. 6B shows a shape of a front end of a tip fabricated when the material of the plate 6 is softer than the material of the tip 1. In the case of FIG. 6A, the front end of the tip is flattened and when the constitution is utilized as a near field light probe in a near field light microscope or a near field light data storage apparatus, an optical aperture can be made very proximate to a surface of a sample or a surface of a record medium. Thereby, stronger near field light interactive operation can be caused and high S/N ratio or high-speed data transmission is enabled. Further, when a conductive substance is present at a surface of a sample or a surface of a record medium, still stronger near field interactive operation is achieved by enhancing interactive operation with a cut face of the optical shielding film 3 at the front end of the tip 1. Meanwhile, in the case of FIG. 6B, there is provided a projected portion 11 at the front end of the tip. When a very small structure is present in the aperture, near field light is provided with a resolution dependent on a size of the structure and when the projected portion 11 as shown by FIG. 6B is present, in the case of a microscope, promotion of resolution is brought about and in the case of the data storage apparatus, promotion of data recording density is brought about. In this way, by changing the material of the plate 6, a tip having a desired shape can simply be fabricated.

(Embodiment 3)

FIG. 7 and FIG. 8 are views for explaining a method of fabricating an optical aperture according to Embodiment 3. FIG. 7 is a top view of a portion of a wafer formed by aligning numbers of the tips 1 and the stoppers 2. A difference thereof from Embodiment 1 resides in that the aperture is fabricated by using a plate 12 shown by FIG. 8 in place of the plate 6 and the other stays the same and accordingly, an explanation thereof will be omitted. The plate 12 shown in FIG. 8 is provided with a size substantially the same as that of the wafer shown in FIG. 7. According to the embodiment, a glass plate is used for the plate. The plate 12 is previously printed with positioning lines 13 and intersections of vertical and longitudinal lines thereof are arranged right above the front ends of the tips 1 shown in FIG. 7. Optical apertures are fabricated at the front ends of the tips 1 by mounting the plate 12 above the wafer, mounting a pressing tool (not illustrated) above the intersections of the positioning lines 13 and impacting the plate 12.

Thereby, positioning of the pressing tool is facilitated, further, even when a material which is not transparent, for example, a metal is used for the plate 12, the optical apertures having a constant size can be fabricated accurately at the front ends of the tips 1.

(Embodiment 4)

FIG. 9 shows a sheet 14 having a pressing plate used in a method of fabricating an optical aperture according to Embodiment 4 of the invention. According to the sheet 14, a plate 16 comprising glass is adhered to a thin sheet 15 comprising polyethylene. Although a size of the plate 16 is in a square shape of 2 mm square according to the embodiment, the size may a pertinent size of from several hundreds μm through several cm. A difference thereof from Embodiment 1 resides in using the sheet 14 having a pressing plate in place of the plate 6. Optical apertures are fabricated at the front ends of the tips 1 by mounting the sheet having the pressing plate on a wafer formed with the tips 1 such that the pressing plates are disposed at portions of the tips (not illustrated) and using a pressing tool (not illustrated). A wafer is not constituted by a completely flat face and is provided with warp since silicon dioxide or the like is laminated on a silicon substrate. According to the embodiment, the constitution in which the plates 16 are adhered to the soft sheet 15, is used and therefore, the pressing plates 16 can be arranged in the form along the warp of the wafer and pressure is applied to the front ends of the tips by the same force at any locations of the wafer. Thereby, the optical apertures having an extremely uniform size can stably be fabricated.

(Embodiment 5)

Figure 10:
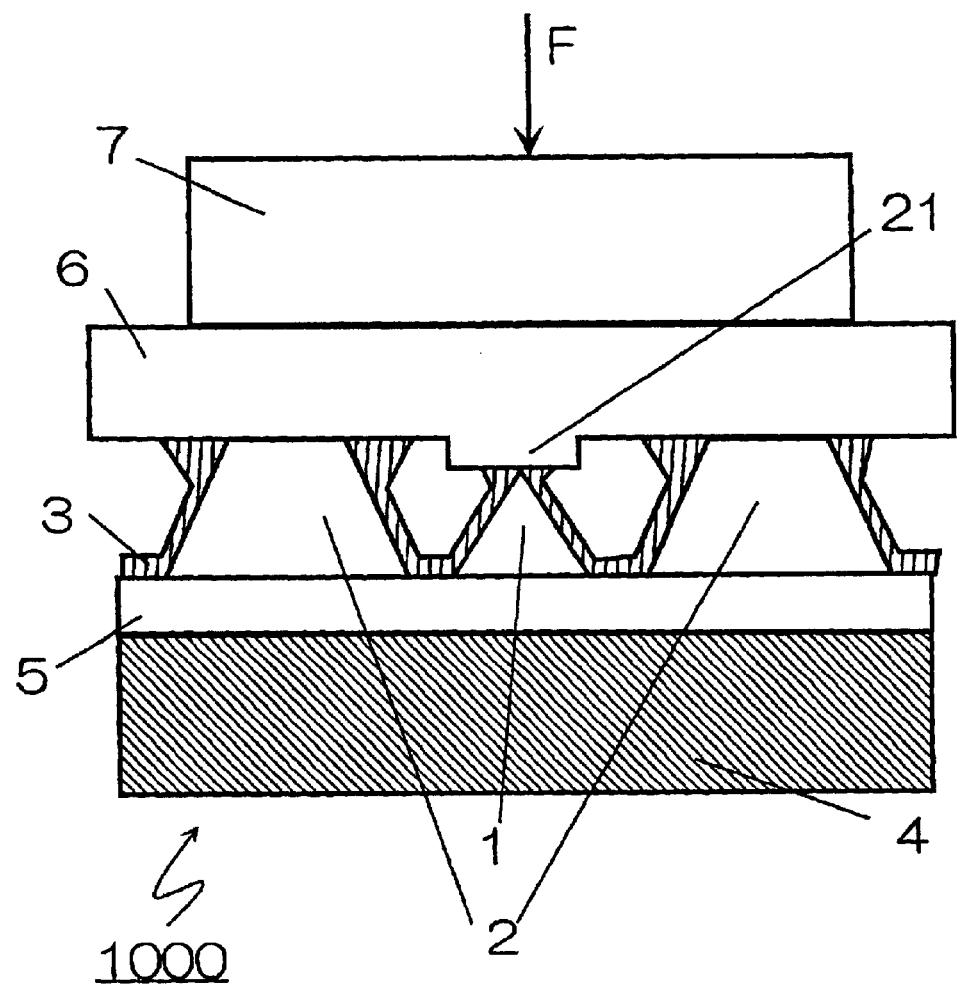
FIG. 10 is a view explaining of a method of fabricating an optical aperture according to Embodiment 5 of the invention.

FIG. 10 is a view showing a state of subjecting the optical shielding film 3 on the tip 1 to plastic deformation in a method of fabricating an optical aperture according to Embodiment 5 of the invention. A difference thereof from Embodiment 1 resides in forming a projection 21 at the plate 6 and the other stays the same and accordingly, an explanation thereof will be omitted. The projection 21 is formed by a pertinent size of from several tens nm to several tens μm. By constituting in this way, even when a distance between contiguous ones of the stoppers 2 is short, the front end of the tip 1 can be subjected to plastic deformation by the projection 21. Thereby, a larger number of the tips can integrally be formed from one sheet of the wafer. Further, even when a large difference of a micrometer order is assumedly present between heights of the tip and the stopper, by adjusting the height of the projection 21, the optical aperture can stably be fabricated.

(Embodiment 6)

An explanation will be given of a method of forming an aperture according to Embodiment 6 of the invention in reference to FIG. 11 and FIG. 12. The embodiment is different from Embodiment 1 in that there is a difference between the height of the tip and the height of the stopper. An explanation of portions thereof the same as those of Embodiment 1 will partially be omitted or simplified.

Figure 11:
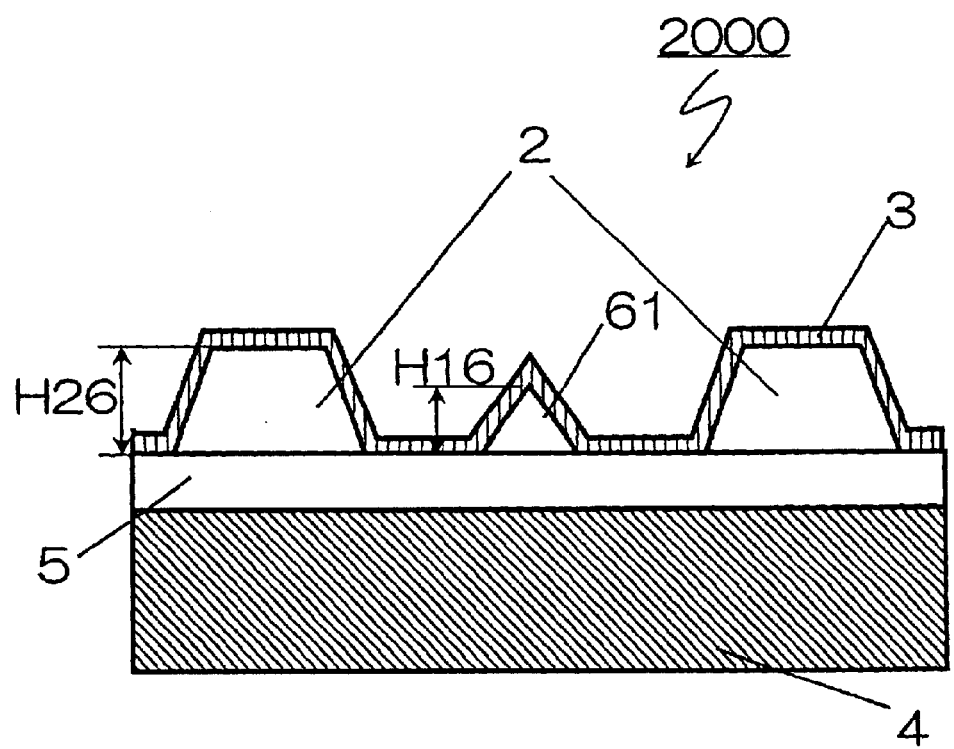
FIG. 11 is a view explaining of a method of forming an aperture according to Embodiment 6 of the invention.

FIG. 11 shows a workpiece in which a height of a tip 61 is lower than the height of the stopper 2. As illustrated, the transparent layer 5 is formed on the substrate 4 and the tip 61 and the stopper 2 in the ridged shape are formed on the transparent layer 5 and the optical shielding film 3 is formed above the tip 61, the stopper 2 and the transparent layer 5. Further, the transparent layer 5 is not necessarily be needed and in that case, the optical shielding film 3 is formed above the tip 61, the stopper 2 and the substrate 4. Further, the optical shielding film 3 may be deposited only at the tip 61.

The height H16 of the tip 61 is equal to or smaller than several mm and the height H26 of the stopper 2 is equal to or smaller than several mm. The difference between the height H16 and the height H26 is equal to or smaller than 1000 nm.

Dielectrics having high transmittivity in a range of visible light such as silicon dioxide or diamond, dielectrics having high transmittivity in a range of infrared light such as SeZn or silicon, or materials having high transmittivity in a range of ultraviolet light such as MgF or CaF, are used for the tip 61, the stopper 2 and the transparent layer 5. Further, as the material of the tip 61, a material of transmitting light through the tip 61 in a wavelength band of light passing through the aperture even by a small amount thereof can be used. Further, the tip 61, the stopper 2 and the transparent layer 5 may be constituted by the same material or may be constituted by separate materials. There are used, for example, metals of aluminum, chromium, gold, platinum, silver, copper, titanium, tungsten, nickel, cobalt and so on or alloys of these are used for the optical shielding film 3.

A method of fabricating an aperture in such workpiece 2000 is quite the same as the method explained in Embodiment 1 and therefore, an explanation thereof will be omitted. However, the amount of plastic deformation provided to the optical shielding film 3 above the tip 61 becomes smaller than the amount of plastic deformation provided to the optical shielding film 3 above the stopper 2. Thereby, the aperture is formed at the front end of the tip 61 and the aperture size become smaller than that when the heights of the tip and the stopper are the same explained in Embodiment 1.

Figure 12:
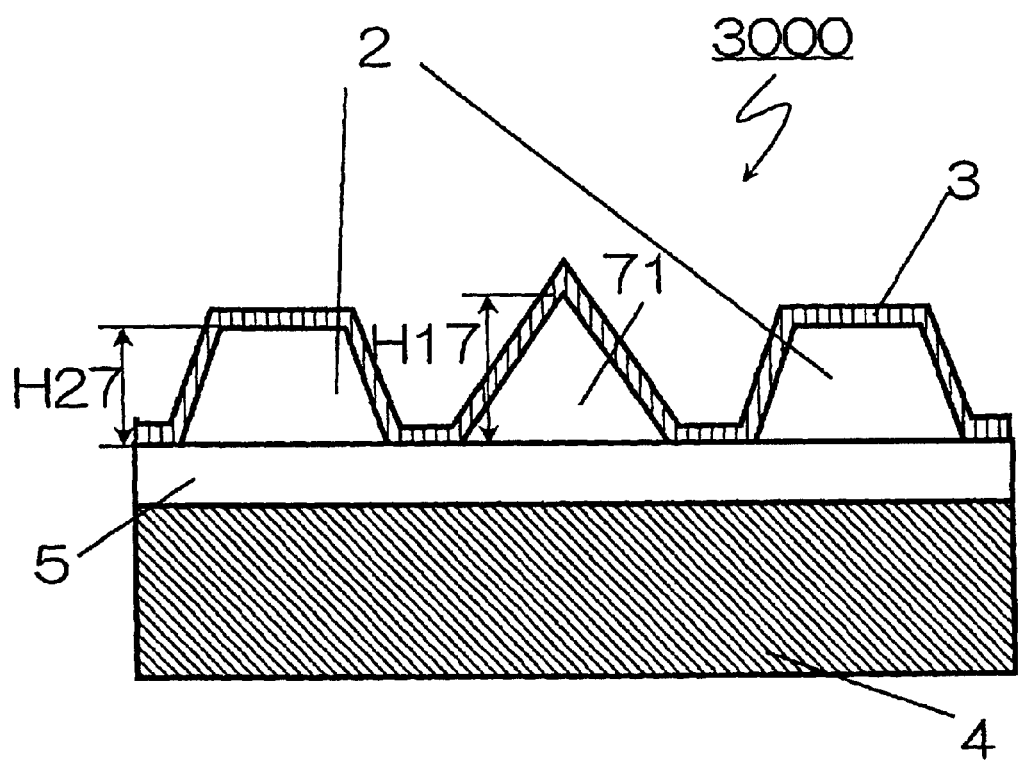
FIG. 12 is a view explaining of the method of forming the aperture according to Embodiment 6 of the invention.

Further, FIG. 12 shows an embodiment when the tip is higher than the stopper contrary to the embodiment of FIG. 11. Other portion is quite the same as that of the embodiment of FIG. 11 and therefore, an explanation thereof will be omitted.

Since a height H17 of a tip 71 is higher than a height H27 of the stopper 2, in fabricating the aperture, the amount of plastic deformation provided to the optical shielding film 3 above the tip 71 becomes larger than the amount of plastic deformation provided to the optical shielding film 3 above the stopper 2. Therefore, the aperture is formed at the front end of the tip 71 and the aperture size becomes larger than that when the heights of the tip and the stopper are the same explained in Embodiment 1.

As has been explained above, by controlling the difference between the height of the tip and the height of the stopper, the size of the aperture fabricated at the front end of the tip can easily be controlled.

Further, when pluralities of pieces of the workpieces 2000 and 3000 are fabricated on one sheet of a wafer, there is a case in which the wafer is warped. Also in such a case, by providing differences between the heights of the tips and the heights of the stoppers, amounts of plastic deformation provided to optical shielding films above tips of the respective workpieces can be made constant and sizes of apertures fabricated at front ends of the tips can be made constant.

FIG. 13 and FIGS. 14A, 14B and 14C are views for explaining a relationship between the heights of the tip and the stopper in the method of fabricating the workpiece explained above. Further, in the following, an explanation will be given of a case in which the height of the tip is lower than the height of the stopper as in the embodiment of FIG. 11.

Figure 13:
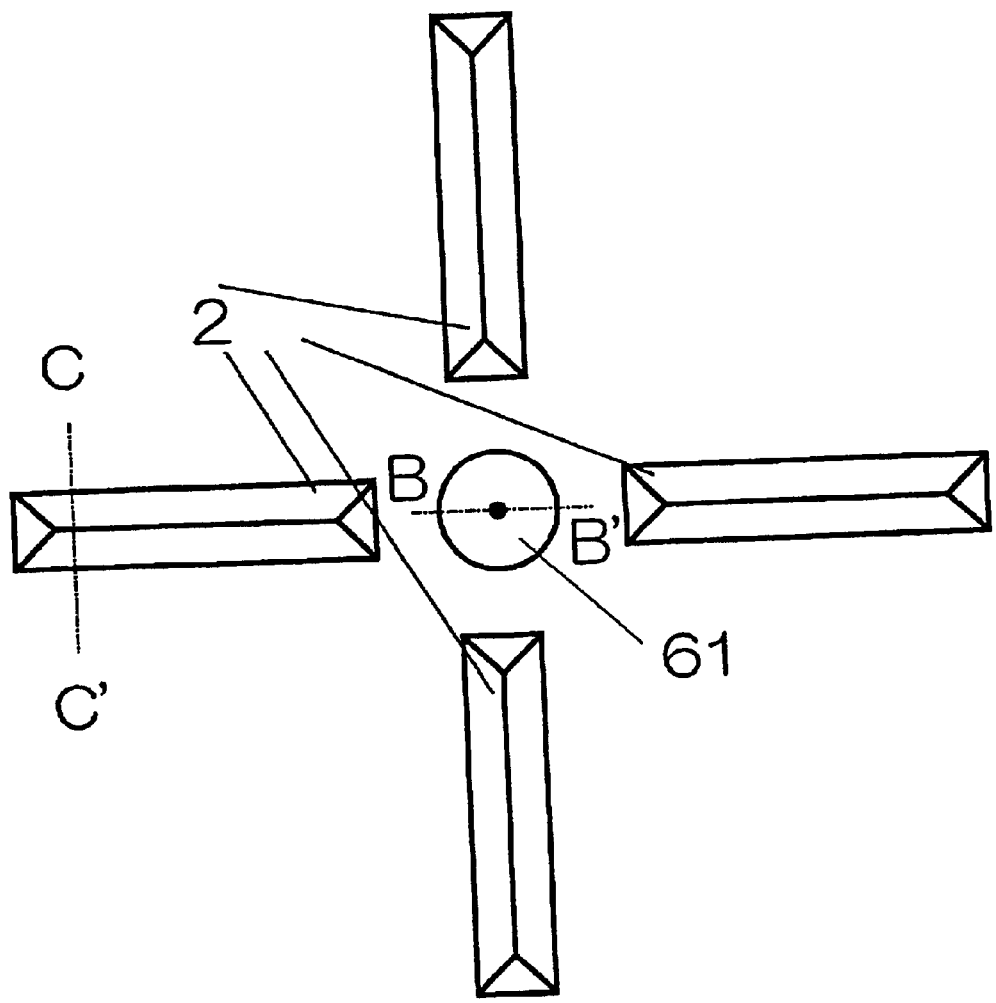
FIG. 13 is a view for explaining a relationship between heights of a tip and a stopper according to Embodiment 6 of the invention.
Figure 14A:
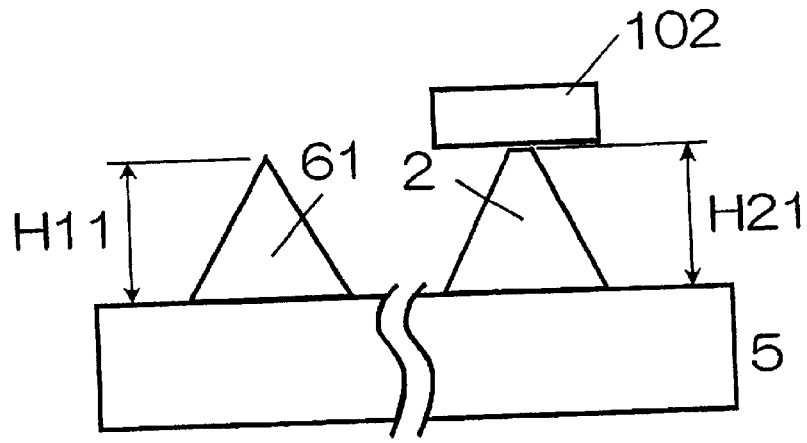
FIGS. 14A, 14B and 14C are views for explaining the relationship between the heights of the tip and the stopper according to Embodiment 6 of the invention.
Figure 14B:
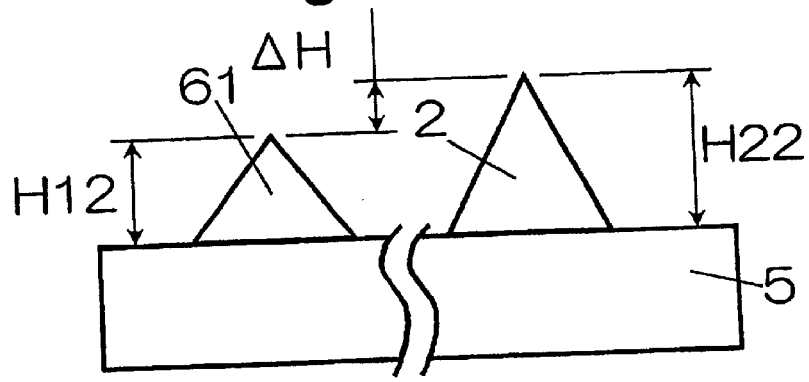
Figure 14C:
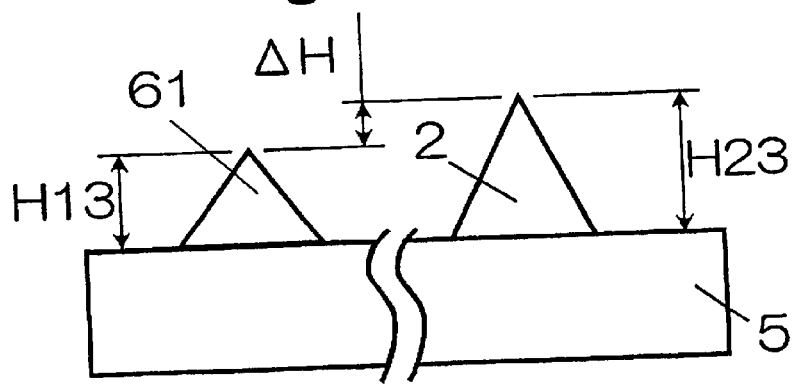

FIG. 13 is a view showing only a tip 61 and the stopper 2 in a state before attaching the optical shielding film in FIG. 11. FIGS. 14A, 14B and 14C are views illustrating both of a section of the tip 61 at a position indicated by B–B' in FIG. 13 and a section of the stopper 2 at a position indicated by C–C' in FIG. 13. FIG. 14A shows a state in which isotropic etching is progressed and the tip 61 is formed in a conical or a pyramidal shape. In the case in which a width of the mask 102 for stopper is larger than a diameter of the mask for tip, when the tip 61 is precisely formed in the conical or the pyramidal shape, a flat portion is left at an upper face of the stopper 2. As shown by FIG. 14A, the mask 102 for stopper is left above the flat portion. Meanwhile, the mask for tip is detached therefrom since the contact area with the tip 61 becomes very small.

In the state of FIG. 14A, a height H11 of the tip 61 and a height H21 of the stopper 2 are the same. FIG. 14B shows a state in which etching is further progressed from the state of FIG. 14A and the flat portion at the upper face of the stopper 2 is just eliminated. When etching is carried out further from the state of FIG. 14A, the height H12 of the tip 61 which is not provided with the mask for tip, is gradually lowered. Meanwhile, the height 22 of the stopper 2 in which the mask for stopper remains, remains unchanged from H21. The width of the flat portion of the upper face of the stopper 2 is gradually narrowed and the sectional shape becomes a triangular shape as shown by FIG. 14B. A difference ΔH between the heights of the tip 61 and the stopper 2 at this occasion is approximately equal to or smaller than 1000 nm although the difference differs by a difference between a diameter of the mask for tip and the width of the mask 102 for stopper and angles of the front ends of the tip 61 and the stopper 2.

FIG. 14C shows a state in which etching is progressed further from the state of FIG. 14B. A height H13 of the tip 61 becomes lower than the height H11. Similarly, a height H23 of the stopper becomes smaller than the height H22. However, amounts of reducing the height H13 and the height H23 are the same and therefore, the difference ΔH between the heights of the tip 61 and the stopper 2 remains unchanged.

Further, when the width of the mask 102 for stopper is smaller than the mask for tip, the relationship between the heights of the tip and the stopper is reversed and there is formed the shape of the workpiece 3000 when the tip is higher than the stopper shown in FIG. 12.

Further, when the width of the mask for tip and the width of the mask for stopper are equal to each other, the heights of the tip and the stopper naturally become equal to each other.

According to the method of fabricating the workpiece of the invention, the difference between the heights of the tip and the stopper can excellently be controlled by the photolithography step.

As has been explained above, according to Embodiment 6 of the invention, in addition to an effect of Embodiment 1, the height of the tip and the height of the stopper can excellently be controlled and the size of the very small aperture fabricated at the front end of the tip can excellently be controlled by the difference between the height of the tip and the height of the stopper.

Further, by summarizingly exerting the force F to one sheet of wafer fabricated with pluralities of pieces of the workpieces 2000 and 3000, a plurality of pieces of plural kinds of apertures having desired aperture sizes can also be fabricated in one operation. When the apertures are summaringly fabricated, although depending on a number of the workpieces per sheet of wafer, a fabricating time period per piece of aperture becomes very short such as several hundreds milliseconds or shorter.

Further, when pluralities of pieces of the workpieces 2000 and 3000 are fabricated on one sheet of wafer, there is a case in which the wafer is warped. Also in such a case, by pertinently controlling the heights of the tips in accordance with the warp, the sizes of the apertures fabricated at the front ends of the tips can be made constant and accordingly, a number of acceptable products taken from one sheet of wafer can be increased and the very small apertures can be fabricated at lower cost.

(Embodiment 7)

An explanation will be given of a method of forming an aperture according to Embodiment 7 of the invention in reference to FIG. 15. The embodiment is an embodiment when there are a plurality of tips between stoppers and a substrate is warped. Therefore, with regard to portions the same as those in Embodiment 1 or Embodiment 6, an explanation will be partially omitted or simplified.

Figure 15:
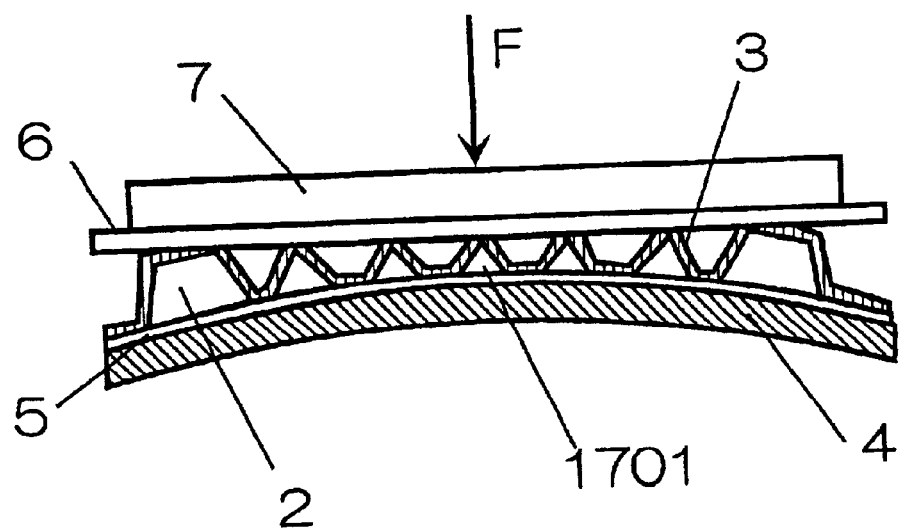
FIG. 15 is a view for explaining of a method of forming an aperture according to Embodiment 7 of the invention.

As shown by FIG. 15, the transparent layer 5 is formed on the substrate 4 and a plurality of tips 1701 and the stoppers 2 on outer sides thereof are formed on the transparent layer 5. Further, the optical shielding film 3 is formed above a plurality of tips 1701, the stoppers 2 and the transparent layer 5. Further, the transparent layer 5 is not necessarily needed and in that case, the optical shielding film 3 is formed above the plurality of tips 1701, the stoppers 2 and the substrate 4. Further, the optical shielding film 3 may be deposited only on the plurality of tips 1701.

The substrate 4 having such a structure is warped as shown by FIG. 15 by a difference between stresses at the surface and the rear face of the substrate. When heights of the plurality of tips 1701 are made to be the same height relative to the substrate 4, an amount of plastic deformation provided to the optical shielding film 3 above the tip 1701 at a vicinity of a center, becomes larger than amounts of plastic deformation provided to the optical shielding film above other ones of the tips 1701 and the size of the aperture fabricated at the front end of the tip 1701 at the vicinity of the center becomes larger.

Hence, according to the embodiment, the heights of the respective tips are changed in correspondence with an amount of warp of the substrate 4. In the case of the embodiment of FIG. 15, the height of the tip at the vicinity of the center is lowered and the heights of the tips are gradually increased toward the tips proximate to the stoppers 2. Such a method of fabricating workpieces is the same as that of Embodiment 6 except that width of masks for tips are changed for the respective tips and therefore, an explanation thereof will be omitted.

By adjusting the heights of the tips in this way, the plate 6 covering at least the plurality of tips 1701 and portions of the stoppers 2 and constituting a flat face is mounted on the plurality of tips 1701 and the stoppers 2, further, the pressing tool 7 is mounted above the plate 6. By exerting the force F to the pressing tool 7 in directions of central axes of the tips 1701, the plate 6 simultaneously presses the optical shielding films 3 above all the tips 1701 since the heights of the tips 1701 are changed in accordance with the amount of warp of the substrate 4. A contact area of the stoppers 2 and the plate 6 is several hundreds through several tens of thousands times as large as a contact area of the tips 1701 and the plate 6. Therefore, the exerted force F is dispersed by the stoppers 2 and as a result, the displacement of the plate 6 is reduced. Since the displacement of the plate 6 is small, an amount of plastic deformation provided to the optical shielding film 3 is very small. The tips 1701 and the stopper 2 are only subjected to very small elastic deformation. Therefore, since the amount of plastic deformation of the optical shielding film 3 is very small and all of the tips 1701 and the stoppers 2 are displaced only in an area of elastic deformation and therefore, apertures having a uniform size are formed at the front ends of all the tips 1701. The aperture size is a size of from several nm to substantially a diffraction limit of a wavelength of light passing through the tip 1701. Further, although according to the above-described, the plate 6 is inserted between the pressing tool 7 and the work piece, even when the plate 6 is removed and the workpiece is pressed directly by the pressing tool 7, the aperture can naturally be formed similarly.

In order to introduce light to the aperture, by etching the substrate 4 from a side thereof opposed to a face of forming the tip 1701, at least a portion of the transparent member 5 or the tip 1701 is exposed and an entrance for light to the aperture is formed. Further, by constituting the substrate 4 by a transparent material, a step of forming the entrance of light can naturally be dispensed with.

Although FIG. 15 shows an embodiment when the substrate 4 is warped in a projected shape, the embodiment is similarly applicable also when the substrate 4 is warped in a recessed shape. In that case, the height of the tip at the vicinity of the center may be increased and the heights of the tips proximate to the stoppers may be lowered.

Further, even when the substrate 4 is wavy, the method according to the foregoing embodiment is also applicable.

Further, all the aperture sizes can be made the same by making the heights of all the tips constant and constituting the shape of the plate 6 or the pressing tool 7 the same as warp of the substrate as explained above.

Further, when several kinds of aperture sizes are intended to form on a single sheet of wafer, the embodiment is applicable by pertinently controlling the heights of the tips or the heights of the stoppers similar to Embodiment 1.

As has been explained above, according to Embodiment 7 of the invention, by controlling the heights of the tips or the shape of the plate or the pressing tool, amounts of plastic deformation provided to the optical shielding film above the plurality of tips fabricated on the substrate which is deformed by warp or the like, can be made constant and all the sizes of the apertures fabricated at the front ends of the tips can be made constant. Therefore, a yield of the apertures taken from a single sheet of wafer is remarkably promoted.

Further, by pertinently controlling the heights of the tips, apertures having several kinds of sizes can stably be fabricated on a single sheet of wafer.

Therefore, in addition to effects of Embodiment 1 and Embodiment 6, a number of the stoppers relative to a number of the apertures can be reduced, a number of elements having very small apertures taken from a single sheet of wafer can considerably be increased and therefore, further low cost formation is achieved.

Further, since a number of apertures which can be fabricated summarizingly is increased, a fabricating time period per piece of aperture can be shortened to one severalth of the fabricating time period of Embodiment 1 or Embodiment 6.
(Embodiment 8)

Next, an explanation will be given of a method of forming an aperture according to Embodiment 8 of the invention in reference to FIG. 16A through FIG. 18B. Further, an explanation will be given of portions duplicated with those of Embodiment 1 by using the same notations.

Figure 16A:
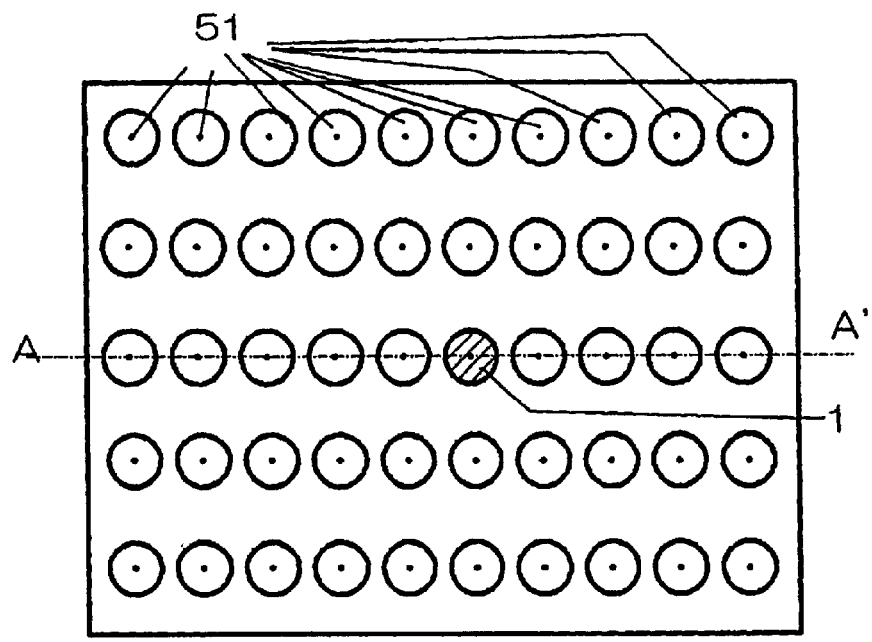
FIGS. 16A, 16B and 16C are views for explaining of a method of forming an aperture according to Embodiment 8 of the invention.
Figure 16B:
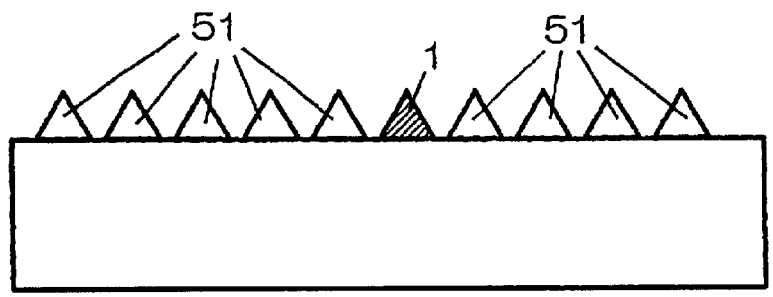

FIG. 16A shows a state of arranging a plurality of tips 51 on the substrate 4. In FIG. 16A, a representative one of tips 51 is designated as the tip 1. FIG. 16B is a sectional view in correspondence with a position indicated by A–A' in FIG. 16A. The height of the tip 51 is a height equal to that of the tip 1. A respective interval between the tips 51 falls in a range of from 100 nm to several 10 mm although depending on the height of the tip 51. The tip 1 and the tips 51 are fabricated by using a pattern arranged with the plurality of masks 101 for tip in place of the mask 102 for stopper in steps of Embodiment 1 explained in reference to FIG. 4A through FIG. 5B.

Figure 16C:
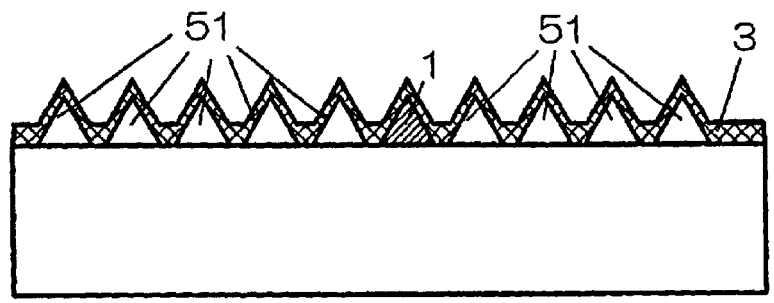

Next, the optical shielding film 3 is deposited on the tip 1 and the tips 51 as shown by FIG. 16C.

Figure 17A:
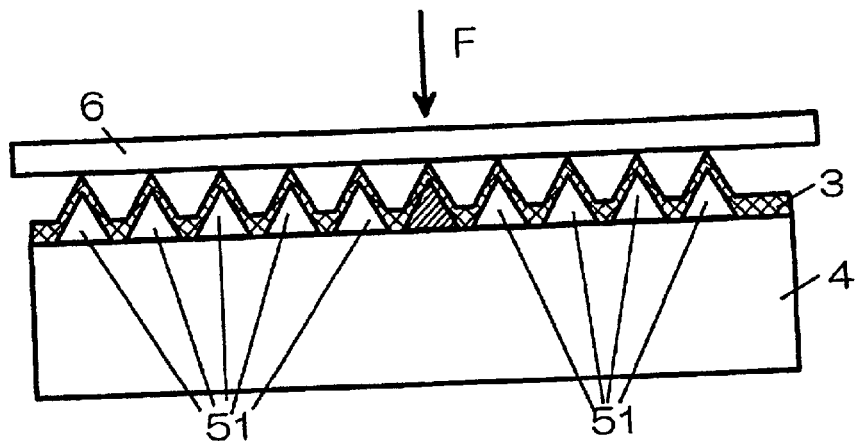
FIGS. 17A, 17B and 17C are views for explaining of the method of forming the aperture according to Embodiment 8 of the invention.
Figure 17B:
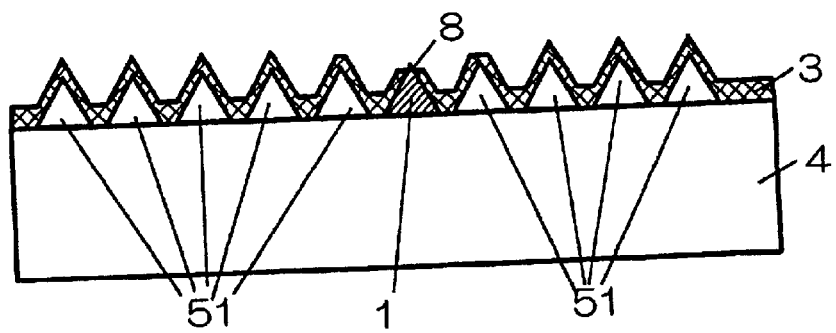

Next, as shown by FIG. 17A, the plate 6 is mounted on the optical shielding film 3 and the predetermined force F is exerted to the tip 1. At this occasion, the tips 51 at a surrounding of the tip 1 functions to serve as the stoppers 2 explained in Embodiment 1 and as shown by FIG. 17B, the aperture 8 is formed at the front end of the tip 1.

Figure 17C:
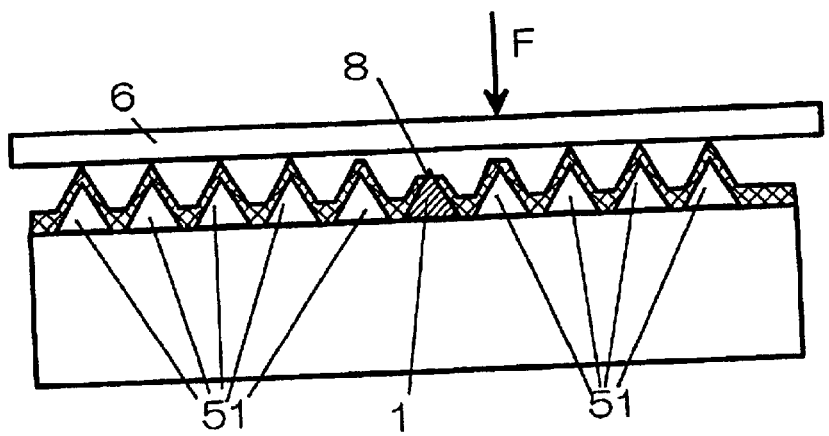

After forming the aperture 8 at the front end of the tip 1, as shown by FIG. 17C, by exerting the force F to the tips 51 contiguous to the tip 1, the apertures 8 can be formed also at the front ends of the tips 51 contiguous to the tip 1. Therefore, by successively exerting the force F to the tips 51, the apertures 8 can be formed at the front ends of the respective tips 51.

Figure 18A:
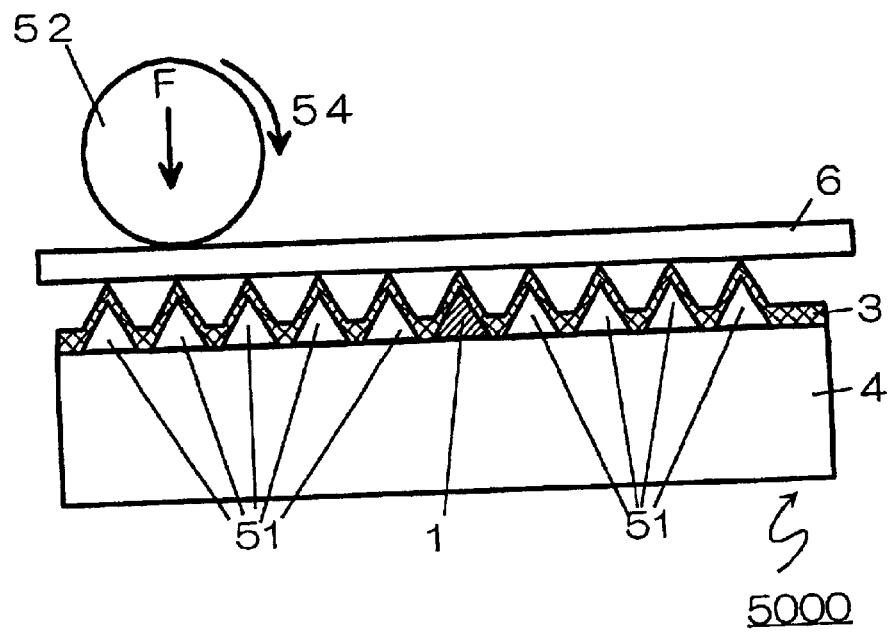
FIGS. 18A and 18B are views for explaining of the method of forming the aperture according to Embodiment 8 of the invention.
Figure 18B:
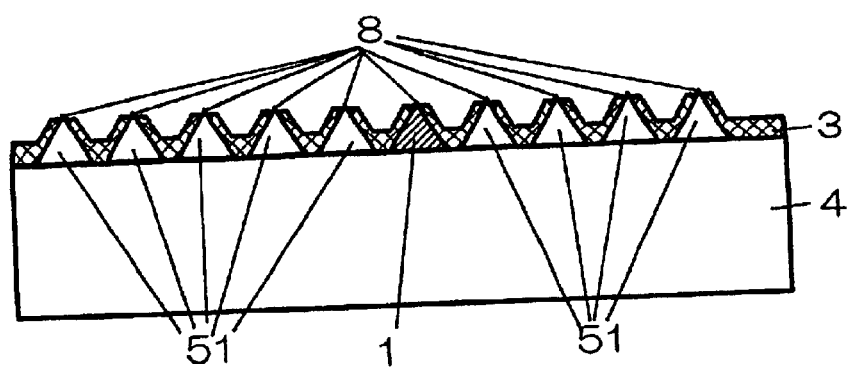

Further, as shown by FIGS. 18A and 18B by mounting the plate 6 above a workpiece 5000 formed with the plurality of tips 51 and the tip 1, exerting the predetermined force F to a roller 52 and rotating the roller 52 in a direction of an arrow mark 54, the optical shielding film 3 at the front ends of the tips 51 and the tip 1 is pressed to crush and the apertures 8 can be formed at the front ends of the respective tips 51 and the tip 1.

As has been explained above, according to Embodiment 5 of the invention, the tips 51 at the surrounding of the tip 1 function as the stoppers, the aperture 8 can simply be formed at the front end of the tip 1 and by repeating similar operation, the apertures 8 can be formed at respectives of the tips 51. Further, by exerting the force F to the plurality of tips 51 and the tip 1 in one operation by the roller 52, the apertures 8 can respectively be formed at the front ends of the tips 51 and the tip 1 and the apertures 8 can be formed in a time period shorter than that in exerting the force one by one.
(Embodiment 9)

Figure 19A:
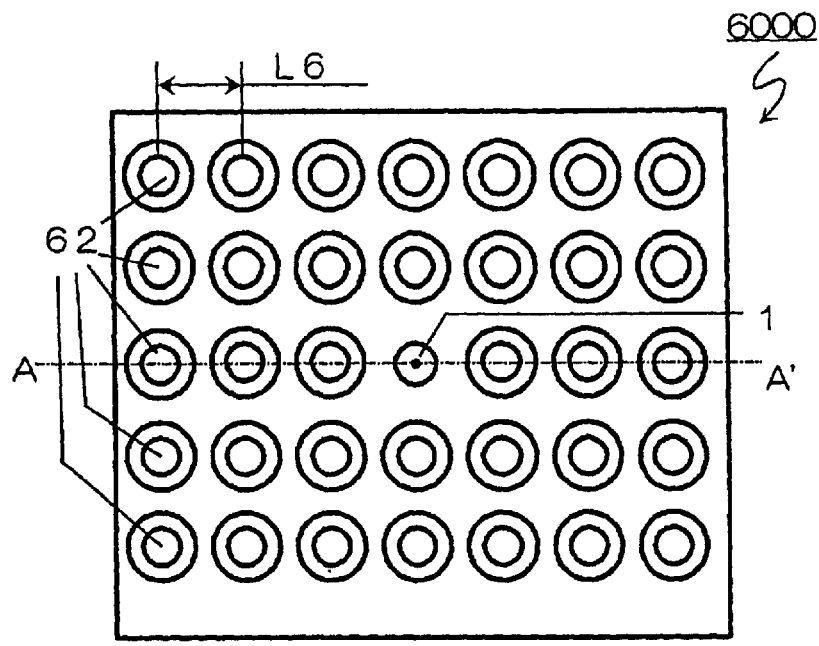
FIGS. 19A, 19B and 19C are views for explaining of a method of forming an aperture according to Embodiment 9 of the invention.
Figure 19B:
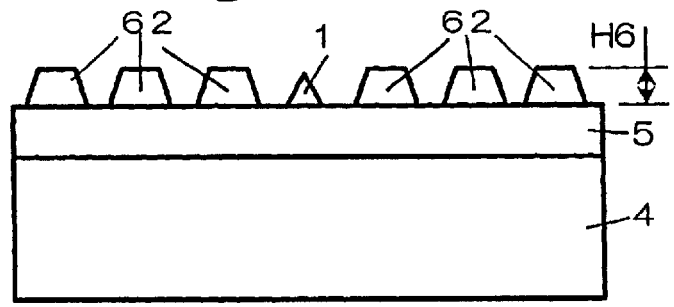

Next, an explanation will be given of a method of forming an aperture according to Embodiment 9 of the invention and a near field light device fabricated by the aperture forming method. Further, an explanation will be given of portions the same as those of Embodiment 1 of the invention by using the same notations. A workpiece 6000 shown in FIG. 19A and FIG. 19B which is a sectional view in correspondence with a position of A–A' of FIG. 19A, is constituted by the substrate 4, the transparent member 5 formed on the substrate 4 and the tip 1 and stoppers 62 formed on the transparent member 5. A shape of the stopper 62 is a shape of a frustrum of a right angle cone and its height H6 is equal to the height of the tip 1 or higher than the height of the tip 1 by about 100 nm. Further, an interval L6 between the stoppers 62 is about 100 through 500 nm and the stoppers 62 are regularly arranged at the surrounding of the tip 1. Further, the transparent member 5 may not be present in constituent elements of the workpiece 6000.

Figure 19C:
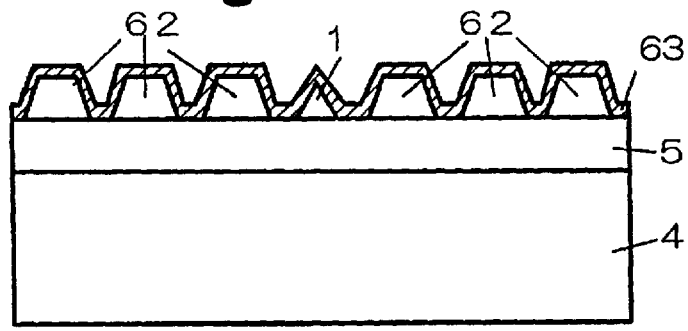

As shown by FIG. 19C, a optical shielding film 63 is formed on the workpiece 6000. A material of the optical shielding film 63 is a metal such as gold, silver or copper. A thickness of the optical shielding film 63 is about 10 through 200 nm although depending on a material used.

Figure 20A:
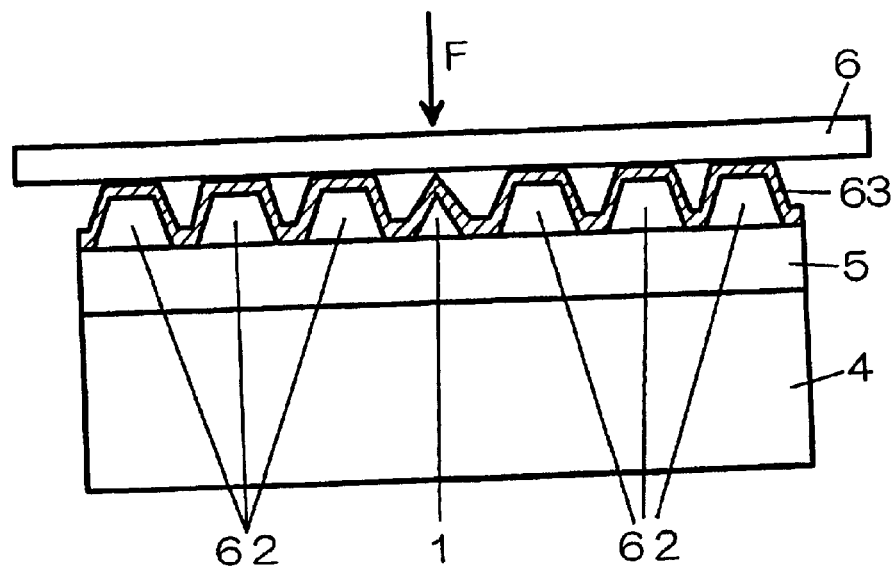
FIGS. 20A and 20B are views for explaining of the method of forming the aperture according to Embodiment 9 of the invention.
Figure 20B:
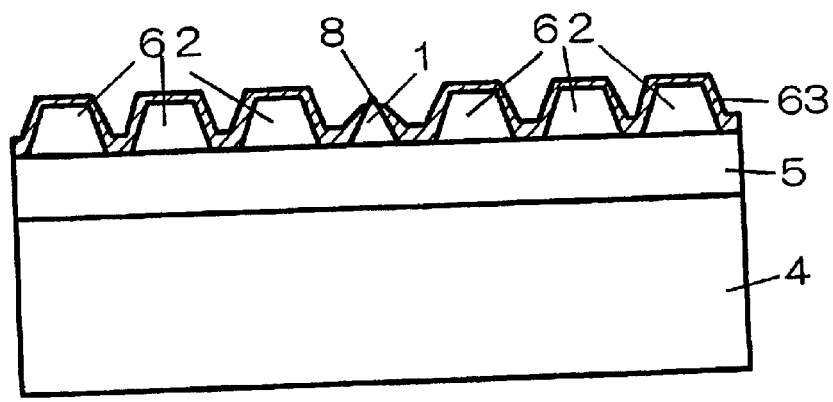

As explained in Embodiment 1, as shown by FIG. 20A, the plate 6 is mounted on the optical shielding film 3, the optical shielding film 63 at the front end of the tip 1 is pressed to crush and as shown by FIG. 20B, the aperture 8 is formed at the front end of the tip 1. In order to introduce light to the aperture 8, an entrance for light to the aperture 8 is formed by exposing the transparent member 5 or the tip 1 and the stoppers 62 in view from its rear face by etching the substrate 4 from a side thereof opposed to a face of forming the tip 1. Further, by constituting the substrate 4 by a transparent material 103, a step of forming the entrance for light can be dispensed with.

By irradiating light from the side of the substrate 4 to the tip 1 and the stoppers 62, near field light is generated from the aperture 8. At this occasion, surface plasmon effect is produced by the regularly arranged stoppers 62 and the optical shielding film 63 formed on the stoppers 62 and an amount of light twice as much as or larger than that in the case of only the aperture 8, is emitted from the aperture 8.

As has been explained above, according to Embodiment 9 of the invention, the surface plasmon effect is produced by the regularly arranged stoppers 62 and the optical shielding film 63 formed on surfaces thereof and the light amount of near field light emitted from the aperture 8 is increased.
(Embodiment 10)

Figure 21:
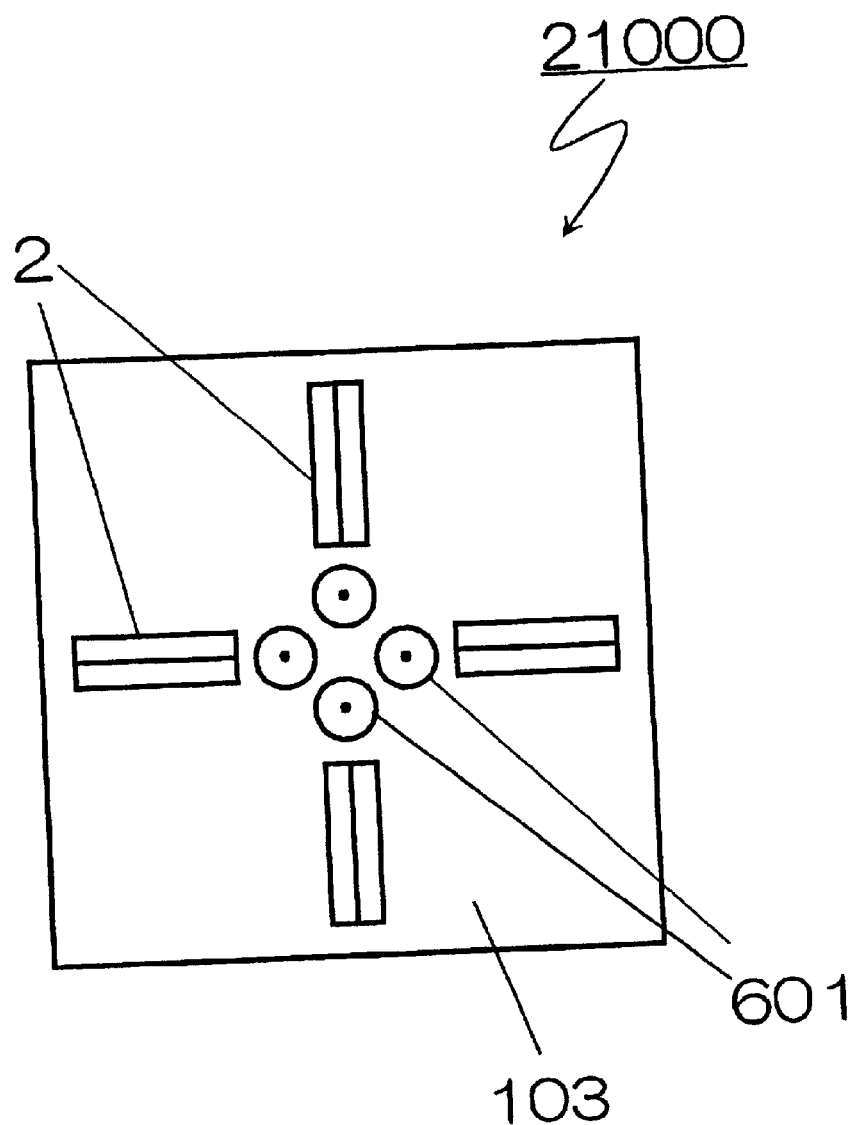
FIG. 21 is a view for explaining of a method of fabricating an optical aperture according to Embodiment 10 of the invention.

FIG. 21 is a view showing a shape of a workpiece 21000 for explaining a method of fabricating an optical aperture according to Embodiment 10 of the invention. In FIG. 21, a optical shielding film is omitted to simplify explanation. Further, a transparent material 103 is formed on a substrate (not illustrated).

The embodiment is an embodiment in a case in which according to a shape of the workpiece 21000, in comparison with the shape of the workpiece 1000 explained in Embodiment 1, there are a plurality of pieces of tips (four in FIG. 21). Therefore, with regard to portions the same as those of Embodiment 1, an explanation will be partially omitted or simplified.

According to a method of fabricating the workpiece 21000 of FIG. 21, the workpiece 21000 can be fabricated similar to the workpiece 1000 of Embodiment 1. The workpiece 1000 of Embodiment 1 is fabricated by forming a mark for one piece of tip, however in the case of the workpiece 21000 of FIG. 21, after forming the masks 101 for four pieces of tips and the masks 102 for stopper, four tips 601 and the stoppers 2 are formed by isotropic etching by wet etching. A radius of front ends of the four tips 601 falls in a range of several nm through several 100 nm. Thereafter, a optical shielding film is deposited by a method of sputtering or vacuum evaporation. Further, when the optical shielding film is deposited only at the tips 601, in a step of depositing the optical shielding film, sputtering or vacuum evaporation is carried out by mounting a metal mask having a shape of depositing the optical shielding film on the tips 601. Further, the optical shielding film can naturally be formed only on the tips 601 by using a photolithography step such that the optical shielding film is left only on the tips 601 after the depositing optical shielding film over an entire face of a face of the workpiece 21000 formed with the tips. Further, there are used, for example, metals of aluminum, chromium, gold, platinum, silver, copper, titanium, tungsten, nickel, cobalt and so on or alloys of these for the optical shielding film.

A method of forming apertures at the optical shielding film on the tips 601 with regard to the workpiece 21000 fabricated in this way, is quite the same as that of Embodiment 1 and therefore, an explanation thereof will be omitted.

In order to introduce light to the aperture fabricated at the optical shielding film on the tip 601, an entrance for light to the aperture is formed by exposing at least a portion of the transparent material 103 or the tip 601 by etching the substrate from a side thereof opposed to a face of forming the tip 601. Further, by constituting the substrate by a transparent material, a step of forming the entrance for light can naturally be dispensed with.

Therefore, the apertures are simultaneously formed respectively at the optical shielding film above the plurality of tips. The size of the respective aperture can be controlled by the height of the respective tip and other than making the sizes of all the apertures the same, a plurality of pieces of different apertures having arbitrary sizes can simultaneously be fabricated.

As has been explained above, according to Embodiment 10 of the invention, in addition to the effect of Embodiment 1 of the invention, by forming a plurality of tips to be surrounded by stoppers, apertures can be fabricated at front ends of a plurality of tips simultaneously and easily.

Further, by summarizingly exerting the force F to a single piece of wafer formed with a plurality of pieces of the workpieces 21000, a larger number of the apertures can be fabricated in one operation. When the apertures are fabricated summarizingly, although depending on a number of the workpieces per sheet of wafer, a fabricating time period per piece of aperture become very short to be one severalth or shorter than that in Embodiment 1 and fabrication cost per aperture can also be reduced significantly.

(Embodiment 11)

Figure 22:
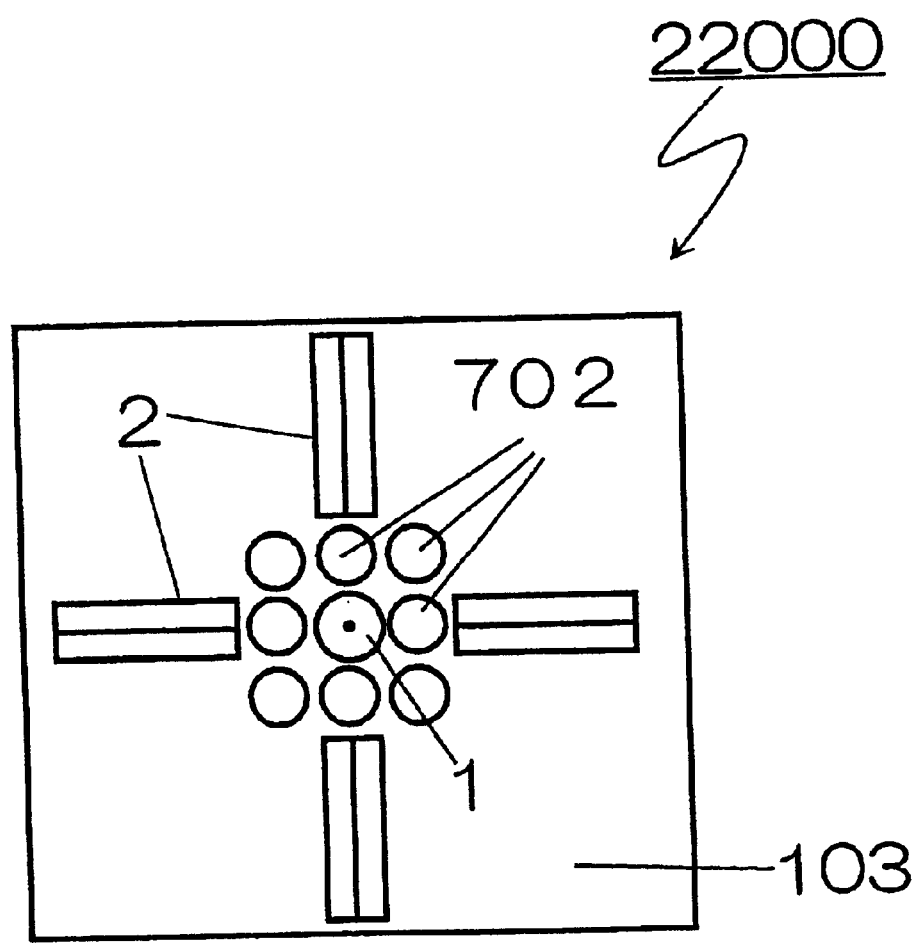
FIG. 22 is a view for explaining of a method of fabricating an optical aperture according to Embodiment 11 of the invention.

FIG. 22 is a view showing a shape of a workpiece 22000 for explaining a method of fabricating an optical aperture according to Embodiment 11 of the invention. In FIG. 22, a optical shielding film is omitted for simplifying explanation. Further, the transparent material 103 is formed on a substrate (not illustrated).

The workpiece 22000 according to the embodiment is provided with very small structural members 702 between the tip and the stoppers. The very small structural members 702 are arranged periodically at distances of about a wavelength. The other constitution is similar to that of the workpiece 1000 explained in Embodiment 1 and accordingly, with regard to portions the same as those of Embodiment 1, an explanation will partially be omitted or simplified.

According to a method of fabricating the workpiece 22000 of FIG. 22, the workpiece 22000 can be fabricated quite similar to the workpiece 1000 of Embodiment 1 with regard to the tip 1 and the stoppers 2. In order to fabricate the workpiece 22000 of FIG. 22, there are further formed the very small structural members arranged periodically at distances of about a wavelength between the tip 1 and the stoppers 2. According to the fabrication method, similar to the method of forming the tip or the stopper, the very small structural member 702 is formed by etching after forming a mask for the very small structural member 702. Naturally, the very small structural member 702 can also be formed simultaneously with forming the tip 1 and the stoppers 2. Or, the very small structural members 702 can also be formed by forming the tip 1 and the stoppers 2 and thereafter aligning the very small structural members 702 physically by using a technology of micromanipulation between the tip 1 and the stoppers 2. Further, all of the tip 1, the stoppers 2 and the very small structural members 702 can separately be formed. Here, a height of the very small structural member 702 is formed to be lower than those of the tip 1 and the stopper 2. Thereafter, a optical shielding film is deposited by a method of sputtering or vacuum evaporation.

With regard to the workpiece 22000 fabricated in this way, a method of forming an aperture at the optical shielding film on the tip 1, is quite the same as that of Embodiment 1 and therefore, an explanation thereof will be omitted.

The height of the very small structural member 702 is lower than the tip 1 and the stopper 2 and accordingly, the aperture is formed only at the optical shielding film on the tip 1.

In order to introduce light to the aperture fabricated at the optical shielding film on the tip 1, an entrance for light to the aperture is formed by exposing at least a portion of the transparent material 103 or the tip 1 by etching the substrate from a side thereof opposed to a face of forming the tip 1. Further, by constituting the substrate by a transparent material, a step of forming the entrance for light can naturally be dispensed with.

By arranging the very small structural members periodically at distances of about a wavelength at a vicinity of the aperture as in the workpiece 22000 of FIG. 22, intensity of near field light provided from the aperture is remarkably increased by the plasmon effect.

Figure 23:
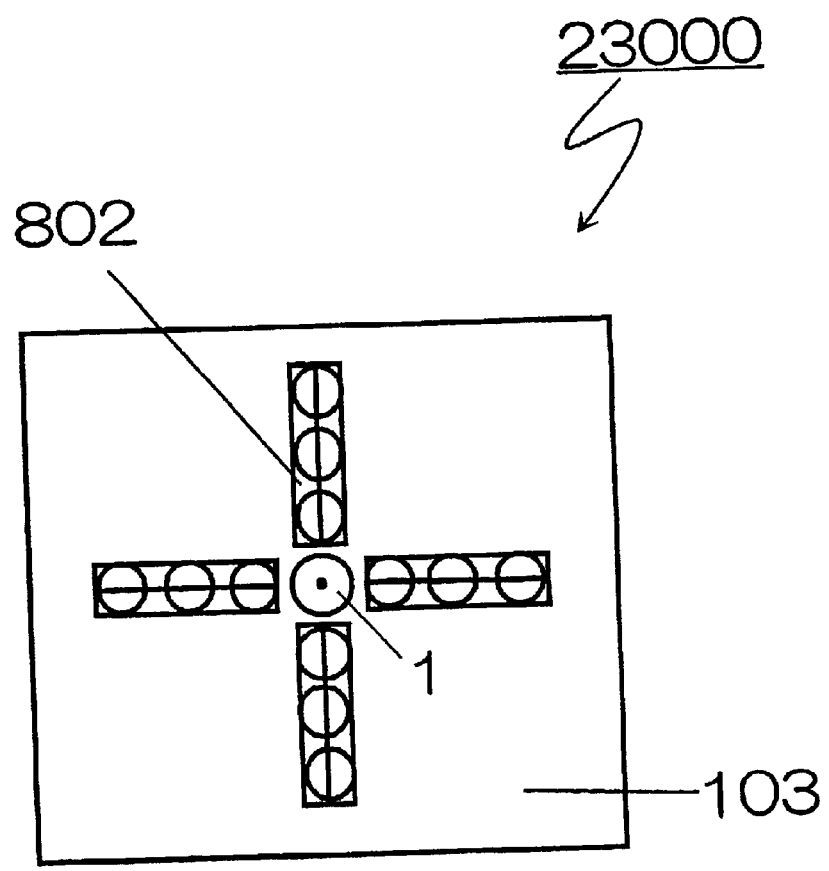
FIG. 23 is a view for explaining of the method of fabricating the optical aperture according to Embodiment 11 of the invention.

Further, FIG. 23 is a view showing a shape of a workpiece 23000 for explaining a method of fabricating other near field light generating element according to Embodiment 11 of the invention. In FIG. 23, a optical shielding film is omitted to simplify explanation. Further, the transparent material 103 is formed on a substrate (not illustrated).

According to the shape of the workpiece 23000 of FIG. 23, similar to the shape explained in the workpiece 22000 of FIG. 22, there are provided very small structural members periodically at a vicinity of an aperture. However, in the case of the workpiece 23000 of FIG. 23, there is provided an embodiment in a case in which a portion of a stopper arranged at a vicinity of the aperture as a stopper 802 having a very small structure, is provided with a periodic very small structure. Therefore, with regard to portions the same as those in explaining the workpiece 22000 of FIG. 22, an explanation will be partially omitted or simplified.

An explanation will be given of a method of fabricating the workpiece 23000 of FIG. 23 as follows.

Similar to Embodiment 1 or Embodiment 10, a mask for the tip 1 and a mask for the stopper 802 having a very small structure are formed above the transparent material 103 by a photolithography step. The mask for the tip 1 and the mask for the stopper 802 having a very small structure may be formed simultaneously or may be formed separately. At this occasion, there is formed a periodic very small structure of about a wavelength at the mask for the stopper 802 having the very small structure.

Next, the tip 1 and the stopper 802 having the very small structure are formed by isotropic etching by wet etching. Thereafter, a optical shielding film is deposited by a method of sputtering or vacuum evaporation. Further, when the optical shielding film is deposited only at the tip 1, in a step of depositing the optical shielding film, sputtering or vacuum evaporation is carried out by mounting a metal mask having a shape of depositing the optical shielding film on the tip 1. Further, also by using a photolithography step of leaving the optical shielding film only at the tip 1 after depositing the optical shielding film over an entire face of a face of the workpiece 23000 formed with the tip 1, the optical shielding film can naturally be formed only on the tip 1.

With regard to the workpiece 23000 fabricated in this way, a method of forming an aperture at the optical shielding film on the tip 1 is quite similar to that of Embodiment 1 and therefore, an explanation thereof will be omitted.

In order to introduce light to the aperture fabricated at the optical shielding film on the tip 1, an entrance for light to the aperture is formed by exposing at least a portion of the transparent material 103 or the tip 1 by etching the substrate from a side thereof opposed to a face of forming the tip 1. Further, by constituting the substrate by a transparent material, a step of forming the entrance for light can naturally be dispensed with.

Similar to the workpiece 22000 of FIG. 22, the workpiece 23000 of FIG. 23 is provided with the very small structural members periodically at distances of about a wavelength at a vicinity of aperture and therefore, intensity of near field light provided from the aperture is remarkably increased by the plasmon effect. Furthermore, according to the workpiece 23000 of FIG. 23, in comparison with the workpiece 22000 of FIG. 22, the stoppers and the very small structural members can be formed by a single sheet of mask and therefore, a number of sheets of photomasks can be reduced.

As has been explained above, according to Embodiment 11 of the invention, in addition to an effect of Embodiment 1 or Embodiment 10 of the invention, by fabricating the very small structures periodically at distances of about a wavelength at a vicinity of the aperture, intensity of near field light can remarkably be increased by the plasmon effect. By increasing the intensity of near field light, laser output of an apparatus using the near field light generating element can be reduced and reduction of heat generating amount, low power consumption and small-sized formation of the apparatus can be expected.

Further, according to the workpiece 23000 of FIG. 23, in comparison with the workpiece 22000 of FIG. 22, the stopper and the very small structural portions can be formed by a single sheet of mask and a number of sheets of photomasks can be reduced. Therefore, the near field light element can be fabricated at lower cost.

Furthermore, in three steps of a step of fabricating the tip, a step of fabricating the stopper and a step of fabricating the periodic very small structural members, two steps or all of the three steps can be realized by a single step and accordingly, the steps of fabricating the near field light element can be reduced and simplification of fabricating steps of fabricating the near field light element, reduction of fabricating time period and further reduction of fabricating cost can be realized.

(Embodiment 12)

Figure 24:
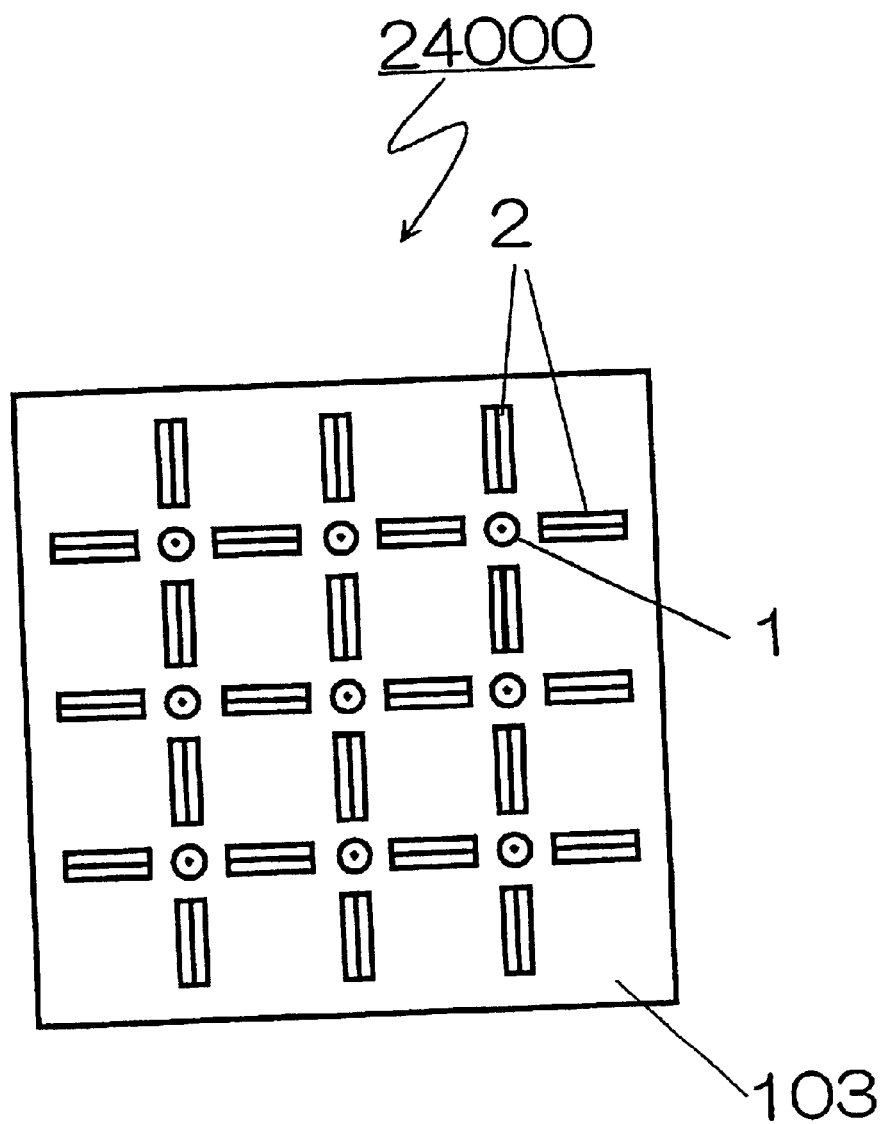
FIG. 24 is a view for explaining of a method of fabricating an optical aperture according to Embodiment 12 the invention.
Figure 25:
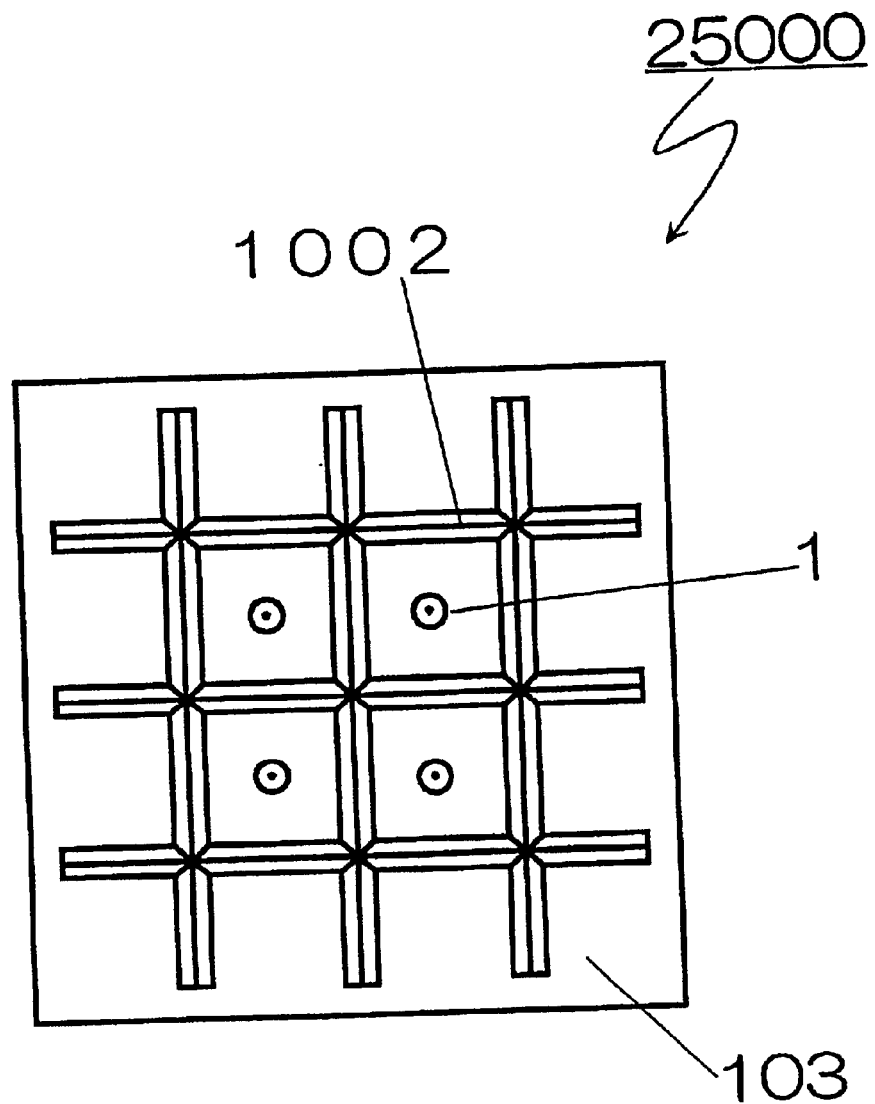
FIG. 25 is a view for explaining of the method of fabricating the optical aperture according to Embodiment 12 of the invention.
Figure 26:
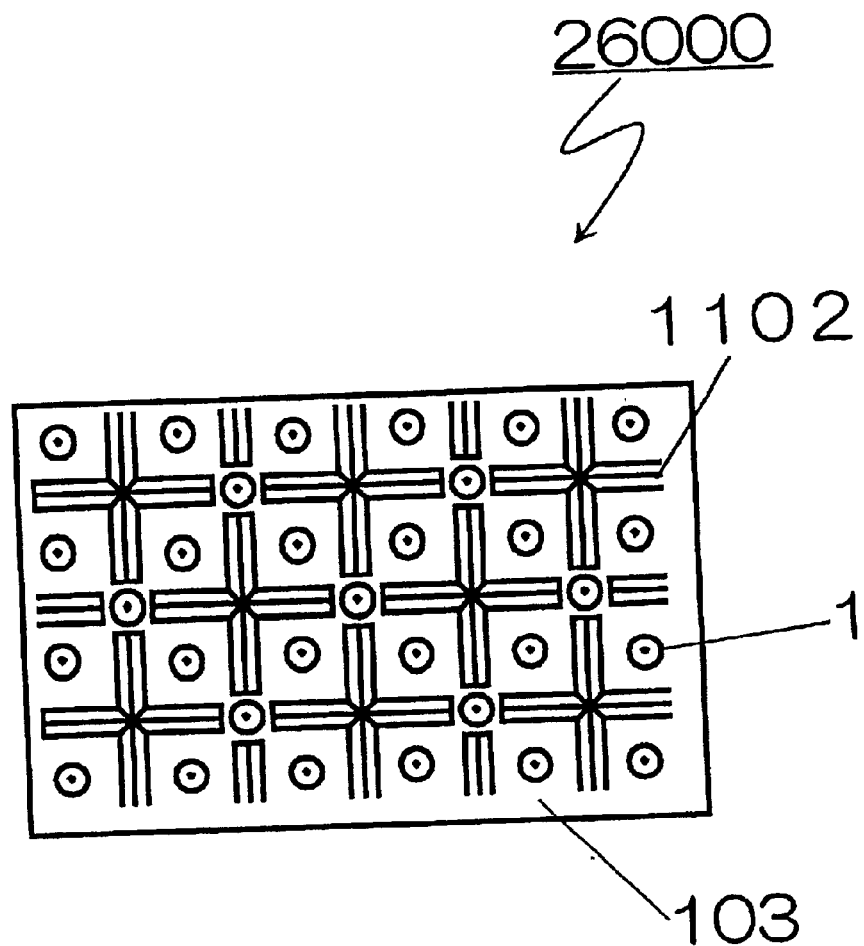
FIG. 26 is a view for explaining of the method of fabricating the optical aperture according to Embodiment 12 of the invention.

FIG. 24 through FIG. 26 are views showing workpieces 24000, 25000 and 26000 for explaining of a method of fabricating an optical aperture according to Embodiment 12 the invention. In FIG. 24 through FIG. 26, optical shielding films are omitted for simplifying explanation. Further, the transparent material 103 is formed on a substrate (not illustrated).

In the Embodiment 12, a plurality of chips of the workpiece 1000 and stoppers described in the Embodiment 1 are disposed, and then the some explanation as that in Embodiment 1 will be partially omitted or simplified.

The workpiece 24000 of FIG. 24 is an embodiment when the tip 1 is surrounded by a plurality of the stoppers 2. In the case of the workpiece 24000, a plurality of the tips 1 are arranged two-dimensionanlly and the stoppers 2 are arranged there among. Although in this case, tips are arranged at apexes of a quadrangular shape, there may be constituted a polygonal shape such as arranging the tips at apexes of a triangular shape.

Further, the workpiece 25000 of FIG. 25 is an embodiment when a plurality of pieces of constitutions each arranged with a single stopper 1002 to surround the tip 1, are aligned. In the case of the workpiece 25000, the stoppers 1002 constitute a quadrangular shape at inside of which a single one of the tip 1 is arranged. The stoppers 1002 can corresponds to other than a quadrangular shape such as a round type. Further, a plurality of the tips may be arranged at inside of the stoppers 1002.

Further, the workpiece 26000 of FIG. 26 is constituted by an arrangement having both of arrangements of the workpiece 24000 of FIG. 24 and the workpiece 25000 of FIG. 25. That is, the tips 1 and the stoppers are very densely arranged.

A method of forming the stopper and the tip and the method of forming the optical shielding film in the workpiece 24000, the workpiece 25000 and the workpiece 26000, is quite the same as those of the case of Embodiment 1 and therefore, an explanation thereof will be omitted.

As has been explained, according to Embodiment 12 the invention, the stoppers 2 are provided at vicinities of the tip 1 and a plurality of pieces of the tips are arranged two-dimensionally and therefore, the displacement of the plate constituting a pushing body can be reduced and therefore, even when an actuator having high resolution is not used, it is easy to simultaneously form very small apertures having a uniform size at front ends of a plurality of the tips. Therefore, by summarizingly fabricating apertures on the plurality of tips, although depending on a number of the tips per sheet of wafer, a fabricating time period per piece of aperture can be made very short and a large amount of apertures can be fabricated at low cost.

Further, when the tips and the stoppers arranged two-dimensionally constitute very small structures periodically at distances of about a wavelength, similar to the case of Embodiment 3, intensity of near field light can remarkably be increased by the plasmon effect. Therefore, similar to Embodiment 11, by increasing the intensity of near field light laser output of an apparatus using the near field light generating element can be reduced and reduction of heat generating amount, low power consumption formation and small-sized formation of the apparatus can be expected.

(Embodiment 13)

Figure 27:
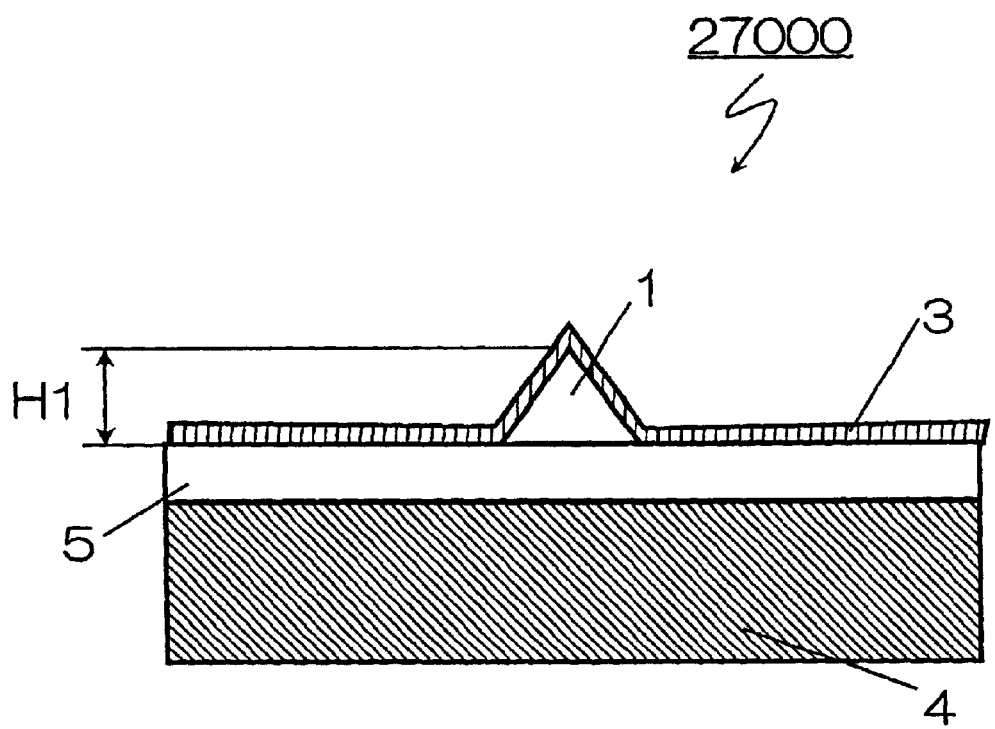
FIG. 27 is a view for explaining of a method of forming an aperture according to Embodiment 13 of the invention.
Figure 28:
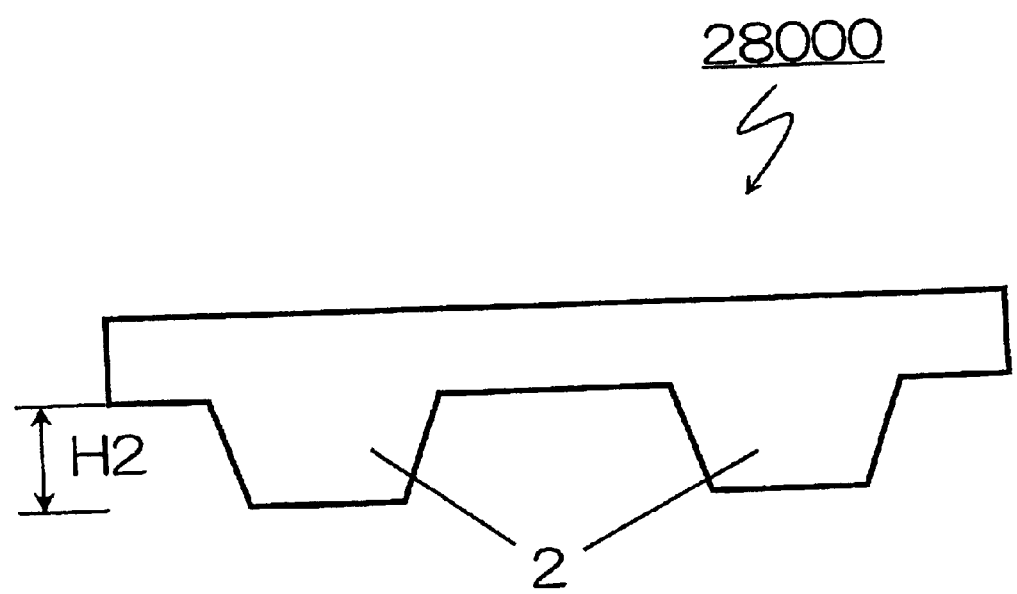
FIG. 28 is a view for explaining of the method of forming the aperture according to Embodiment 13 of the invention.
Figure 29:
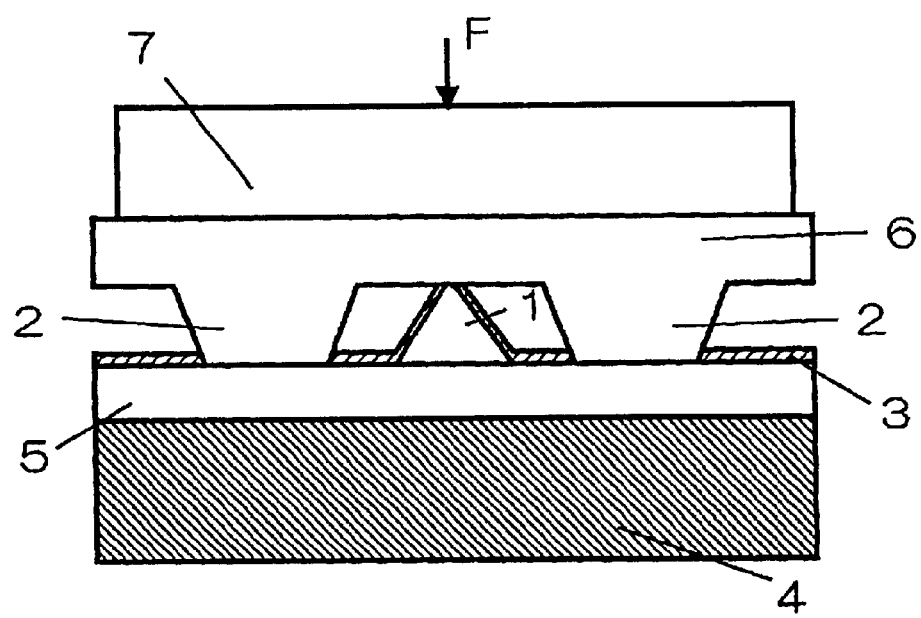
FIG. 29 is a view for explaining of the method of forming the aperture according to Embodiment 13 of the invention.

FIG. 27 through FIG. 29 are views explaining a method of forming an aperture according to Embodiment 13 of the invention. A workpiece 27000 shown in FIG. 27 is provided with the transparent layer 5 formed on the substrate 4, the tip 1 of a conical or pyramidal shape formed on the transparent layer 5 and the optical shielding film 3. Further, in the workpiece 27000, the transparent layer 5 is not necessarily needed and in that case, the optical shielding film 3 is formed above the tip 1 and the substrate 4. Further, the optical shielding film 3 may be deposited only to the tip 1. A plate 28000 shown in FIG. 28 is formed with the stopper 2. Although in FIG. 28, two pieces of the stoppers are formed, a larger number of pieces thereof may be formed. An interval between the stoppers is formed to be longer than a length of a base of the tip 1 in FIG. 27 and to be longer by, for example, several through several hundreds micrometers. A height H1 of the tip 1 is equal to or smaller than several nm and a height H2 of the stopper 2 is equal to or smaller than several mm. A difference between the height H1 and the height H2 is equal to or smaller than 1000 nm. Further, a thickness of the optical shielding film 3 falls in a range of several 10 nm through several 100 nm although the thickness differs by a material of the optical shielding film 3.

There are used dielectrics having high transmittivity in a range of visible light such as silicon dioxide, diamond and so on, dielectrics having high transmittivity in a region of infrared light such as SeZn, silicon and the like and materials having high transmittivity in a region of ultraviolet light such as MgF, CaF and so on for the tip 1, the stopper 2 and the transparent layer 5. Further, as the material of the tip 1, a material for transmitting light in a wavelength band of light transmitting the aperture even by a small amount can be used. Further, the tip 1, the stopper 2 and the transparent layer 5 may be constituted by the same material or may be constituted by separate materials. There are used metals of aluminum, chromium, gold, platinum, silver, copper, titanium, tungsten, nickel, cobalt and so on and alloys of these for the optical shielding film 3.

FIG. 29 is a view showing a state of subjecting the optical shielding film 3 on the tip 1 to plastic deformation in a method of forming an aperture. The plate 28000 having the stoppers 2 are mounted on the workpiece 27000 shown in FIG. 27 and the pressing tool 7 is further mounted on the plate 28000. In this case, transparent glass is used for the plate 28000. Even after mounting the plate 28000, a position of the tip 1 can be confirmed by a microscope or optical observation. According to the embodiment, positions of the tip 1 and the pressing tool 7 are confirmed from two directions by a microscope and the pressing tool 7 is arranged right above the tip 1. By exerting the force F to the pressing tool 7 in a direction of a central axis of the tip 1, the plate 28000 is moved toward the tip 1. A contact area of the stopper 2 and the plate 28000 is several hundreds through several tens of thousands times as large as a contact area of the tip 1 and the plate 28000. Therefore, the exerted force F is dispersed by the stopper 2 and as a result, displacement of the plate 28000 is reduced. Since the displacement or the plate 28000 is small, an amount of plastic deformation provided to the optical shielding film 3 is very small. Further, the tip 1 and the stoppers 2 are subjected only to very small elastic deformation. As methods of exerting the force F, there are a method of lifting a weight having a predetermined weight by a predetermined distance and dropping the weight freely, a method of attaching a spring having predetermined spring constant to the pressing tool 7 and pressing the spring by a predetermined distance and so on. When the plate 28000 comprises a material harder than the optical shielding film and softer than the tip 1 and the stopper 2, the force received by the tip 1 and the stoppers 2 is absorbed by the plate 28000 and accordingly, the displacement of the plate 28000 is reduced further and an amount of plastic deformation of the optical shielding film 3 can easily be reduced.

Figure 30:
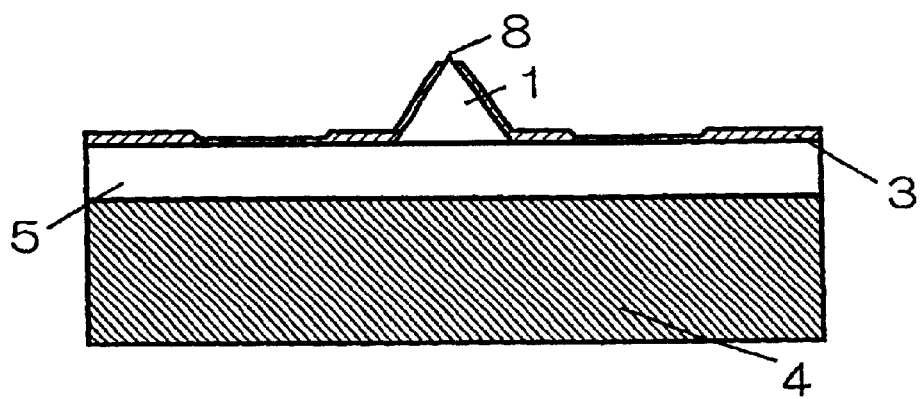
FIG. 30 is a view showing a state in which after exerting force F, a plate 28000 and a pushing tool 7 are removed in the method of forming the aperture according to Embodiment 13 of the invention.

FIG. 30 is a view showing a state of removing the plate 28000 and the pressing tool 7 after exerting the force F. The amount of plastic deformation of the optical shielding film 3 is very small, the tip 1 and the stopper 2 are displaced only in the area of elastic deformation and therefore, the aperture 8 is formed at the front end of the tip 1. The size of the aperture 8 is a size of from several nm to about a diffraction limit of a wavelength of light passing through the tip 1. To introduce light to the aperture 8, an entrance for light to the aperture 8 is formed by exposing at least a portion of the transparent member 5 or the tip 1 by etching the substrate 4 from a side thereof opposed to a face of forming the tip 1. Further, by constituting the substrate 4 by a transparent material 103, a step of forming the entrance for light can be dispensed with.

As has been explained above, according to the method of fabricating the aperture of the invention, the displacement of the plate 28000 can excellently be controlled by the stoppers 2, further, the displacement of the plate 28000 can be made very small and therefore, the aperture 8 having a uniform and small size can easily be fabricated at the front end of the tip 1. Further, near field light can be generated from the aperture 8 by irradiating light from the side of the substrate.

Figure 31A:
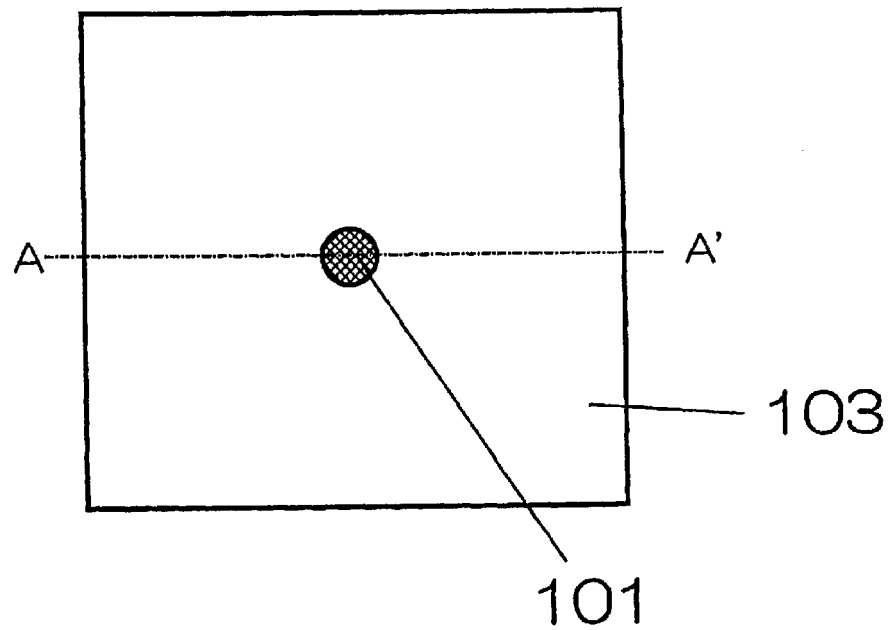
FIGS. 31A and 31B are views showing a state in which after forming a transparent material 103 on a substrate material 104, a mask 101 for tip is formed in the method of forming the aperture according to Embodiment 13 of the invention.
Figure 31B:
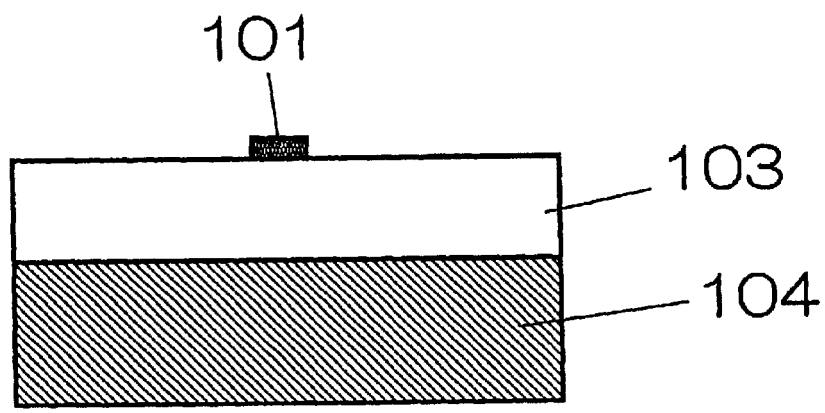

Next, an explanation will be given of a method of fabricating the workpiece 27000. FIGS. 31A and 31B show a state in which after forming the transparent material 103 on the substrate material 104, the mask 101 for tip is formed. FIG. 31A shows a top view and a FIG. 31B shows a sectional view at a position indicated by A–A' of FIG. 31A. The transparent material 103 is formed on the substrate material 104 by chemical vapor deposition (CVD) or spin coat. Further, the transparent material 103 can be formed on the substrate material 104 also by a method of solid state bonding or glue. Next, the mask 101 for tip is formed on the transparent material 103 by a photolithography step.

As the mask 101 for tip, a photoresist or a nitride film is used although depending on a material of the transparent material 103 and an etchant used in a successive step. There are used dielectrics having high transmittivity in a range of visible light such as silicon dioxide or diamond, dielectrics having high transmittivity in a region of infrared light such as SeZn or silicon or materials having high transmittivity in a range of ultraviolet light such as MgF or CaF for the transparent material 103.

Figure 32A:
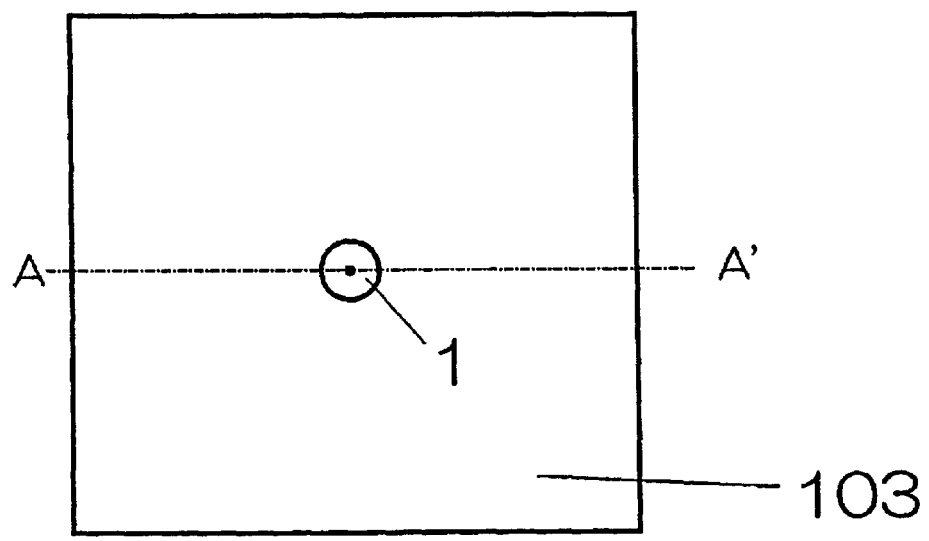
FIGS. 32A and 32B are views showing a state of forming a tip 1 in the method of forming the aperture according to Embodiment 13 of the invention.
Figure 32B:
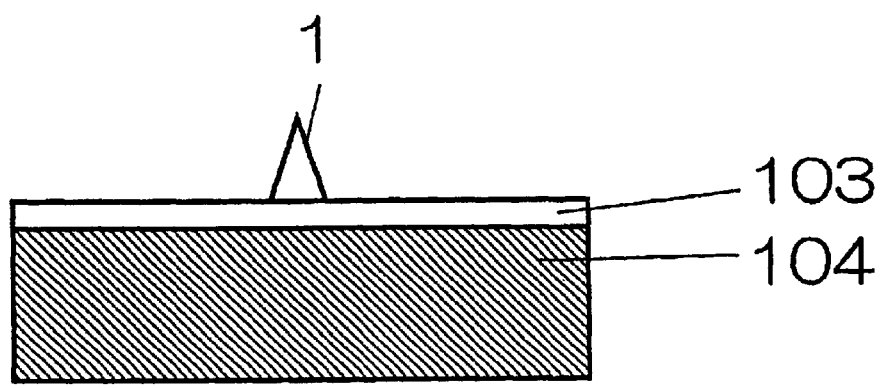

A diameter of the mask 101 for tip is, for example, equal to or smaller than several mm. FIGS. 32A and 32B show a state of forming the tip 1. FIG. 32A is a top view and FIG. 32B is a sectional view at a position indicated by A–A' of FIG. 32A. After forming the mask 101 for tip, the tip 1 is formed by isotropic etching by wet etching. By adjusting a relationship between a thickness of the transparent material 103 and a height of the tip 1, the transparent layer 5 shown in FIG. 1 is formed or is not formed. A radius of a front end of the tip 1 falls in a range of several nm through several 100 nm. Thereafter, by depositing the optical shielding film by a method of sputtering or vacuum evaporation, the workpiece 27000 shown in FIG. 27 can be formed. Further, when the optical shielding film 3 is deposited only on the tip 1, in a step of depositing the optical shielding film 3, sputtering or vacuum evaporation is carried out by mounting a metal mask having a shape of depositing the optical shielding film on the tip 1. Further, the optical shielding film 3 can be formed only on the tip 1 also by using a photolithography step of leaving the optical shielding film 3 only on the tip 1 after depositing the optical shielding film 3 over an entire face of a face of the workpiece 27000 formed with the tip.

The plate 27000 shown in FIG. 28 can be fabricated by a method similar to that of the workpiece 27000. Only difference is the shape of the mask and therefore, although an explanation of a method of fabricating the plate 27000 will be omitted, the workpiece 27000 and the plate 28000 comprise, for example, the same material and are fabricated by etching the material by the same amount by etching the material by the same time period by the same etchant. By using a mask having a different size, a difference between the height H1 of the tip 1 and the height H2 of the stopper 2 can be formed by a desired value.

As has been explained above, according to Embodiment 13 of the invention, the heights of the tip 1 and the stopper 2 can excellently be controlled, further, by providing the stopper 2, displacement of the plate 28000 can be reduced and accordingly, even when an actuator having high resolution is not used, the aperture 8 having a uniform and very small size can easily be formed at the front end of the tip 1. According to an experiment of the inventors, by only knocking at the pressing tool 7 by a hand-held hammer, the aperture 8 having a diameter equal to or smaller than 100 nm can be formed. Further, since the heights of the tip 1 and the stopper 2 are excellently controlled, a yield of fabricating the aperture 8 is promoted. Further, the workpiece 27000 explained in Embodiment 13 of the invention, can be fabricated by a photolithography step and accordingly, a plurality of pieces thereof can be fabricated at a sample having a large area such as a wafer and by making the force F constant, the apertures 8 having a uniform aperture diameter can be formed at respectives of the workpiece 27000 fabricated by a plurality of pieces thereof. Further, since it is very simple to change the magnitude of the force F, the apertures 8 having different aperture diameters can be formed individually for the workpieces 27000 fabricated by a plurality of pieces thereof. Further, the aperture 8 is formed by simply exerting the force F and accordingly, a time period taken for fabricating the aperture is as very short as several seconds through several tens seconds. Further, any fabrication environment may be used according to Embodiment 13 of the invention. Therefore, Embodiment 13 can be fabricated in the atmosphere and the fabricated state can be immediately be observed by an optical microscope. Further, by carrying out the fabrication in a scanning electron microscope, the fabricated state can be observed by resolution higher than that of the optical microscope. Further, by carrying out the fabrication in a liquid, the liquid serves as a damper and therefore, the fabricating conditions having further promoted controllability can be achieved.

Further, by summarizingly exerting the force F to a sample formed with a plurality of pieces of the workpieces 27000, a plurality of pieces of the apertures 8 having a uniform aperture diameter can also be fabricated in one operation. When fabricated summarizingly, although depending on a number of the workpieces 27000 per sheet of wafer, a fabricating time period per piece of aperture can be made as very short as several hundreds milliseconds or shorter.

Further, according to Embodiment 13 of the invention, in addition to the effect explained in Embodiment 1, since it is not necessary to form the stopper 2 at the workpiece 27000, in fabricating a device dispensed with the stopper 2, a step of removing the stopper 2 is dispensed with and the aperture 8 can be formed inexpensively.

What is claimed is:

1. A method of fabricating an optical aperture, comprising the steps of:
   providing an object having a substrate, at least one conical- or pyramidal-shaped tip disposed on the substrate, at least one stopper disposed on the substrate at a vicinity of the tip, and an optical shielding film disposed on at least a portion of each of the stopper and the tip;
   providing at least one pressing body;
   disposing a surface of the pressing body in confronting relation to the object; and
   displacing the pressing body to bring the surface of the pressing body into contact with the object so that a force component is directed to a front end of the tip to form an optical aperture at the front end of the tip.

2. A method of fabricating an optical aperture, comprising the steps of:
   providing an object having a substrate, a conical- or pyramidal-shaped tip disposed on the substrate, and an optical shielding film disposed at least on the tip;
   providing a pressing body having a a main surface and a stopper projecting from the main surface;
   disposing the main surface of the pressing body in confronting relation to the object; and
   bringing the pressing body into contact with the object so that a force component is directed to a front end of the tip to form an optical aperture at the front end of the tip.

3. A method of fabricating an optical aperture according to claim 1; wherein the at least one conical- or pyramidal-shaped tip comprises a plurality of conical- or pyramidal-shaped tips; and wherein the bringing step comprises bringing the surface of the pressing body into pressure contact with the object so that a force component is directed to a front end of each of the tips so that an optical aperture is formed at the front end of each of the tips.

4. A method of fabricating an optical aperture according to claim 1; wherein the stopper controls the displacement of the pressing body.

5. A method of fabricating an optical aperture according to claim 1; wherein the pressing body is made of a material softer than a material of the tip.

6. A method of fabricating an optical aperture according to claim 1; wherein the surface of the pressing body comprises a substantially flat surface.

7. A method of fabricating an optical aperture according to claim 1; wherein the displacing step includes the step of applying a force on a portion of the pressing body disposed generally opposite the front end of the tip.

8. A method of fabricating an optical aperture according to claim 1; wherein the pressing body is made of an optically transparent material.

9. A method of fabricating an optical aperture according to claim 3; wherein the at least one pressing body comprises a plurality of pressing bodies disposed on a structural member made of a soft material.

10. A method of fabricating an optical aperture according to claim 1; wherein the pressing body has a projection extending from the surface thereof; and wherein the disposing step comprises disposing the pressing body relative to the object so that the projection of the pressing body confronts the tip.

11. A method of fabricating an optical aperture according to claim 1; wherein the pressing body is made of a softer material than a material of the optical shielding film.

12. A method of fabricating an optical aperture according to claim 1; wherein a height of the tip and a height of the stopper are substantially equal to each other.

13. A method of fabricating an optical aperture according to claim 1; wherein a height of the tip and a height of the stopper are different.

14. A method of fabricating an optical aperture according to claim 1; wherein a difference between a height of the tip and a height of the stopper is selected so that the force component directed to a front end of the tip during the displacing step has a preselected magnitude.

15. A method of fabricating an optical aperture according to claim 14; wherein preselected magnitude is selected in accordance with a shape of the substrate.

16. A method of fabricating an optical aperture according to claim 1;
wherein the pressing body and the substrate have substantially the same shape.

17. A method of fabricating an optical aperture according to claim 1; wherein the at least one conical- or pyramidal-shaped tip comprises a plurality of conical- or pyramidal-shaped tips and the at least one stopper comprises a plurality of stoppers disposed adjacent the tip; and wherein the bringing step comprises bringing the surface of the pressing body into pressure contact with the object so that a force component is directed to the front end of at least one of the tips so that tips adjacent to the at least one tip constitute the stoppers and the optical aperture is formed at the front end of the at least one tip.

18. A method of fabricating an optical aperture according to claim 17; wherein the aperture is formed at the front end of at least one of the tips constituting one of the stoppers.

19. A method of fabricating an optical aperture according to claim 1; wherein the at least one conical- or pyramidal-shaped tip comprises a plurality of conical- or pyramidal-shaped tips and the at least one stopper comprises a plurality of stoppers projecting from the substrate and surrounding the tips; and wherein the optical shielding film is formed of the stoppers.

20. A method of fabricating an optical aperture according to claim 1; further comprising a plurality of very small structural members arranged at periodic intervals at a vicinity of the tip.

21. A method of fabricating an optical aperture according to claim 20; wherein the at least one stopper comprises a plurality of stoppers; and wherein the stoppers constitute the structural members.

22. A method of fabricating an optical aperture according to claim 20; wherein the structural members are disposed between the stopper and the tip.

23. A method of fabricating a probe for a near field light device, the method comprising the steps of:
    forming on a substrate a least one probe tip for transmitting light having a preselected wavelength;
    forming a stopper on the substrate so as to surround the probe tip;
    covering the probe tip with an optical shielding film;
    providing a pressing body having a generally flat surface portion; and
    forming an optical aperture at a front end of the probe tip by exerting a force simultaneously to the probe tip and the stopper using the flat surface of the pressing body.

24. A method according to claim 23; wherein the step of forming the at least one probe tip comprises the step of forming a plurality of probe tips on the substrate, the step of forming the stopper comprises forming a plurality of stoppers each surrounding a respective one of the probe tips, the covering step comprises covering each of the probe tips with an optical shielding film, and the step of forming the optical aperture comprises forming an optical aperture at a front end of each of the probe tips by exerting a force simultaneously to the probe tips and the stoppers using the flat surface of the pressing body.

* * * * *